US008103530B2

(12) United States Patent
Quiring et al.

(10) Patent No.: US 8,103,530 B2
(45) Date of Patent: Jan. 24, 2012

(54) ENHANCING INSIGHT-DRIVEN CUSTOMER INTERACTIONS WITH AN OPTIMIZING ENGINE

(75) Inventors: Kevin N. Quiring, Minneapolis, MN (US); Tore Berg, Denver, CO (US); Vincent U. Dell'Anno, Monument, CO (US); Julio J. Hernandez, Atlanta, GA (US); Alyse S. Kornfeld, New York, NY (US); Steven L. Lew, Newton, MA (US); Dawn E. Palmer, Danville, CA (US); David A. Shapiro, Minneapolis, MN (US); David Slaw, Nodlesville, IN (US); Sajid Usman, Leominster, MA (US); Rodney B. Whitsett, Thousand Oaks, CA (US); Robert E. Wollan, St. Paul, MN (US)

(73) Assignee: Accenture Global Services Limited, Dublin (IE)

( * ) Notice: Subject to any disclaimer, the term of this patent is extended or adjusted under 35 U.S.C. 154(b) by 1767 days.

(21) Appl. No.: 10/811,367

(22) Filed: Mar. 26, 2004

(65) Prior Publication Data

US 2007/0083418 A1    Apr. 12, 2007

(51) Int. Cl.
*G06Q 10/00* (2006.01)
(52) U.S. Cl. .................................................. 705/7.11
(58) Field of Classification Search ................ 705/7.11
See application file for complete search history.

(56) References Cited

U.S. PATENT DOCUMENTS

| | | | |
|---|---|---|---|
| 5,737,726 A | | 4/1998 | Cameron et al. |
| 6,014,647 A * | | 1/2000 | Nizzari et al. .................. 705/39 |
| 6,047,261 A * | | 4/2000 | Siefert ............................. 705/11 |
| 6,055,513 A * | | 4/2000 | Katz et al. ....................... 705/26 |
| 6,112,190 A | | 8/2000 | Fletcher et al. |
| 6,230,197 B1 * | | 5/2001 | Beck et al. ..................... 709/223 |
| 6,334,110 B1 * | | 12/2001 | Walter et al. ..................... 705/14 |
| 6,412,012 B1 | | 6/2002 | Bieganski et al. |
| 6,886,037 B1 | | 4/2005 | Brewer et al. |
| 7,016,936 B2 * | | 3/2006 | Wilkinson et al. ............. 709/205 |
| 7,370,004 B1 * | | 5/2008 | Patel et al. ................. 705/14.37 |

(Continued)

FOREIGN PATENT DOCUMENTS

EP          1 154 627 A2    11/2001

(Continued)

OTHER PUBLICATIONS

EPO Examination Report dated Mar. 31, 2008 issued on Application #05 718 462.4-2221.

(Continued)

*Primary Examiner* — Johnna Loftis
*Assistant Examiner* — Brandi P Parker
(74) *Attorney, Agent, or Firm* — Finnegan, Henderson, Farabow, Garrett & Dunner LLP

(57) ABSTRACT

Insight-driven interactions with customers may be enhanced in a holistic approach. A customer relationship management ("CRM") methodology may include: (1) evaluating a customer strategy; (2) identifying customer segments from a customer base; (3) forming an interaction strategy; (4) defining a series of experiences based on the strategy; (5) applying those interactions with customers during interactions; and (6) monitoring the results of the customer interactions. A computer aid may preferably guide a user through some of these steps. A modular, vendor-independent, centralized, rules-based engine may perform processing to deliver tailored customer experiences, relying on values for prioritized experiences identified through use of the computer aid.

21 Claims, 34 Drawing Sheets

U.S. PATENT DOCUMENTS

| | | | |
|---|---|---|---|
| 2002/0059283 A1 | 5/2002 | Shapiro et al. | |
| 2002/0069261 A1 | 6/2002 | Bellare et al. | |
| 2002/0087385 A1* | 7/2002 | Vincent | 705/10 |
| 2002/0112035 A1* | 8/2002 | Carey et al. | 709/219 |
| 2003/0041050 A1 | 2/2003 | Smith et al. | |
| 2003/0069780 A1 | 4/2003 | Hailwood et al. | |
| 2003/0220901 A1* | 11/2003 | Carr et al. | 707/1 |
| 2003/0229884 A1 | 12/2003 | Carr et al. | |
| 2004/0006506 A1 | 1/2004 | Hoang | |
| 2004/0264670 A1 | 12/2004 | Flores et al. | |

FOREIGN PATENT DOCUMENTS

EP     1 154 627 A3   11/2001

OTHER PUBLICATIONS

EPO Examination Report dated Mar. 31, 2008 issued on Application #05 718 472.3-2221.

Feb. 4, 2010 Final Office Action mailed in U.S. Appl. No. 10/811,439.

May 4, 2010 Office Action mailed in Canadian Patent Application No. 2,560,992.

* cited by examiner

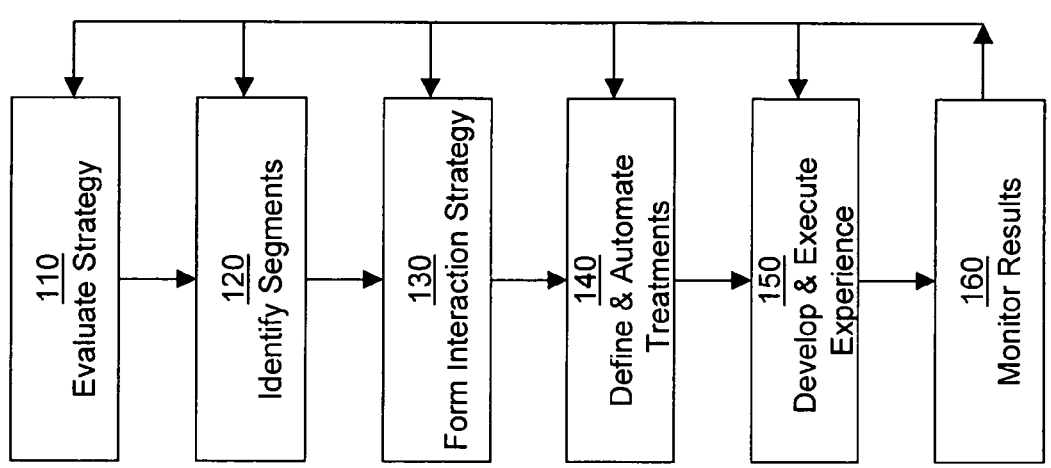
Figure 1  THE METHODOLOGY

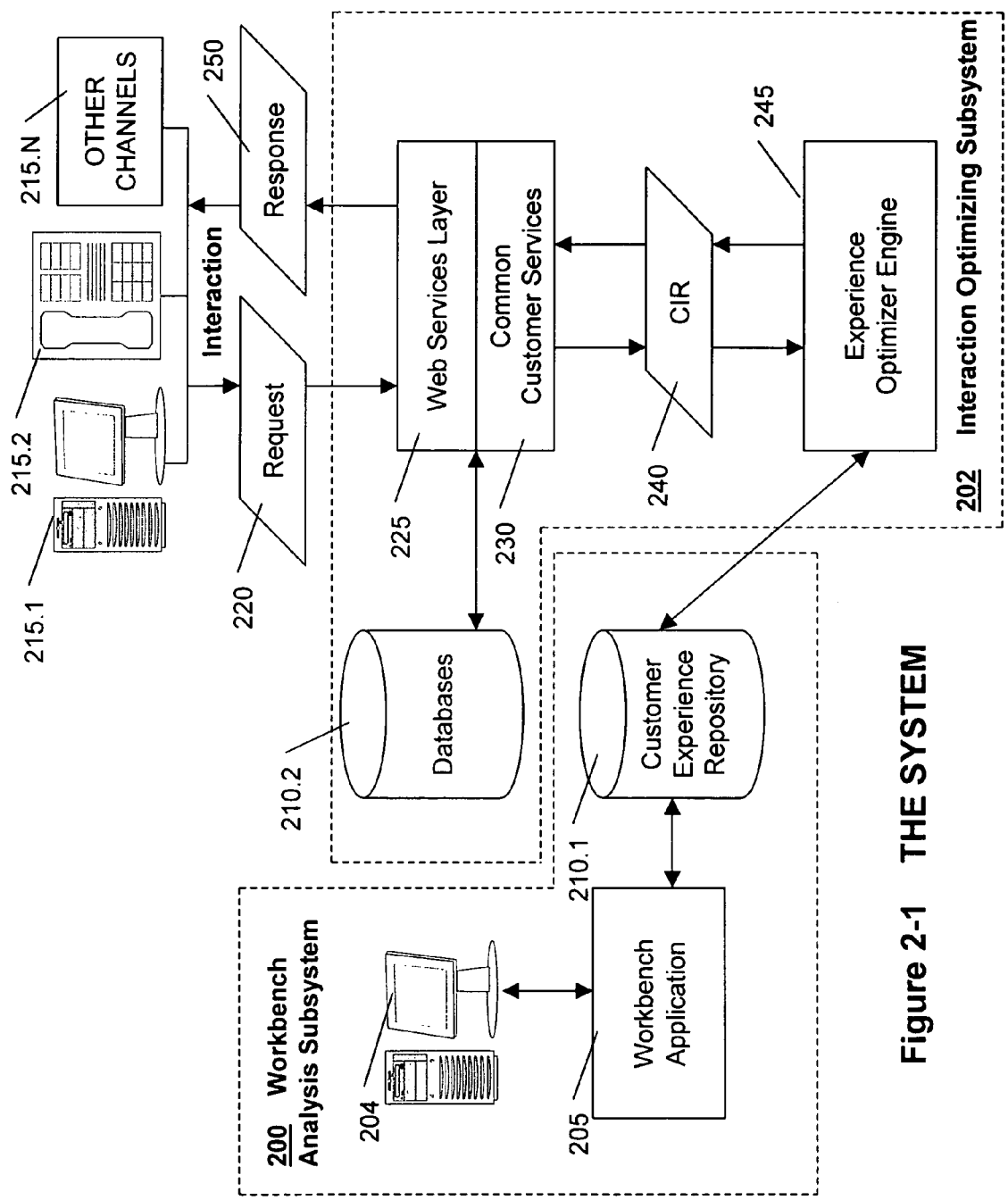
Figure 2-1 THE SYSTEM

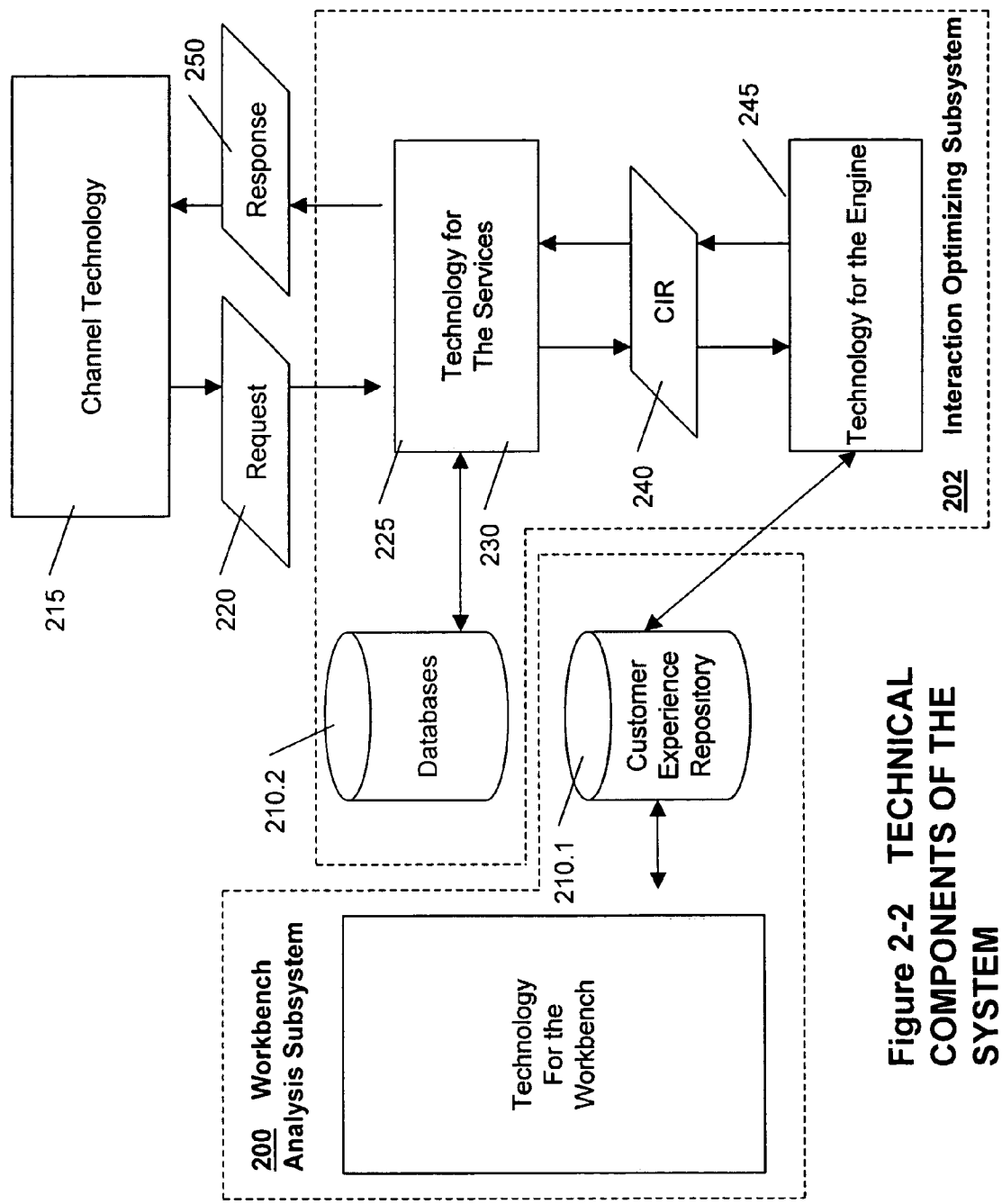
Figure 2-2 TECHNICAL COMPONENTS OF THE SYSTEM

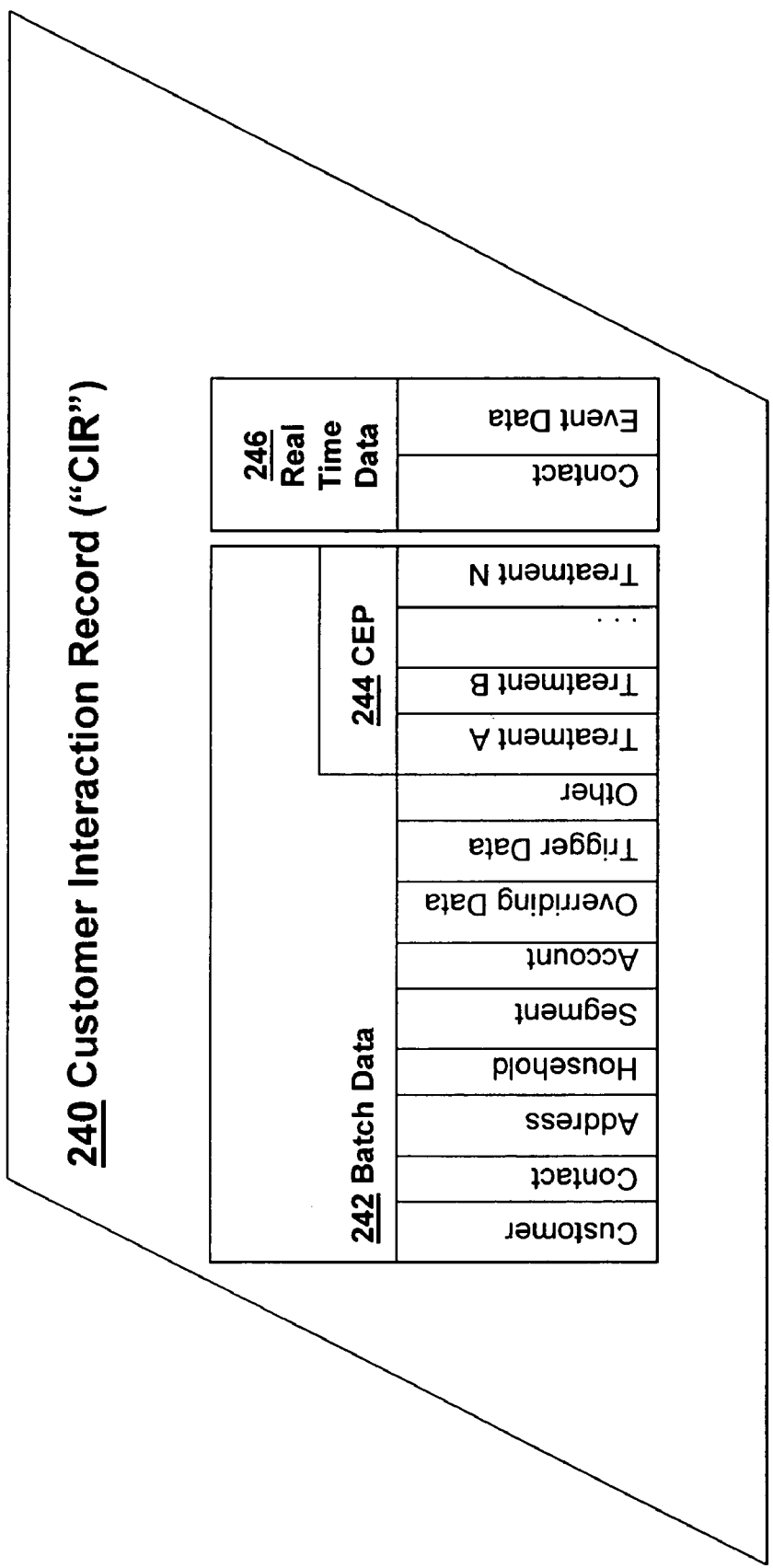
Figure 2-3   CIR FORMAT

Segment Profiles

| Variable / Statistics | Average | Maximum | Minimum | Variance |
|---|---|---|---|---|
| At-Risk Core (51) | | | | |
| CSR Calls | 1.59 | 3 | 0.1 | 0.66 |
| Products | 2.73 | 4.5 | 0.5 | 1.83 |
| Revenue | 123.75 | 342.95 | 45.95 | 6869.44 |
| Tenure | 21.28 | 99 | 1.5 | 332.9 |
| Usage | 1639.22 | 12000 | 400 | 466831.37 |
| Usage Limit | 1768.63 | 6000 | 400 | 1714896.08 |
| Utilization | 0.33 | 0.55714 | 0.1 | 0.01 |
| Web Logins | 8.13 | 16.5 | 0.5 | 27.08 |

View Detailed Profile

Budget Managers
View Detailed Profile
- Low-to-medium utilization, usually below allowance
- Low DSL ownership

Loyal Core
View Detailed Profile
- 2% of population represents 2% of revenues, 6% of usage
- Avg. utilization
- Highest cost-to-serve; higher than average billing inquiries
- Avg. number of billing adjustments

- 32% of population, 2nd in longevity
- Have and average of 1-2 products
- Below average cost-to-serve
- 2 sub-segments: Web users & non-web users (see "Web Savvy")

- Perform Business Value Assessment
- Assign and Prioritize Experience
- Monitor Experience Value
- Help
- Logout

Figure 3-4

| | | |
|---|---|---|
| 107602199956 | North | Sep 27, 1998 |
| 119154654604 | Not Assigned | Dec 27, 2001 |
| 151880630823 | Not Assigned | Jun 12, 2001 |
| 158724460667 | North | Jun 13, 2002 |
| 173514759393 | East | Dec 31, 1998 |
| 186439457528 | North | Oct 10, 1998 |
| 193875038613 | North | Jan 31, 1999 |
| 226933596638 | Not Assigned | Jan 22, 2003 |
| 231504490402 | East | Jul 30, 1998 |
| 233527785013 | North | Aug 29, 2001 |
| 248768399985 | Not Assigned | Nov 23, 2001 |
| 252881172688 | North | May 27, 2002 |
| 278869278829 | Not Assigned | Jul 09, 2001 |
| 279517534110 | Not Assigned | Jan 22, 1999 |
| 280925570191 | North | Jul 13, 1999 |

3610

Interaction Reason Reports:
- Agent Contact Counts
- Interaction Reason Usage
- IVR Service Strategy Executive Summary
- Experience Definition Overview

Segment Reports:
- Percent of Customers in Each Segment
- Segmentation Profiles

| Treatment Category | Business Processes — These treatments focus on business processes and policies that often are exception or specialized situations based on customer data. | Contact Handling — These treatments focus on agent, channel and routing decisions that may differ depending upon the customer data | Marketing & Communications — These treatments focus on types of offers or messages that should be delivered based on customer data |
|---|---|---|---|
| Treatment Element Examples | Example Treatments Elements<br>-Optimize Category Assortments<br>-Rationalize Space Allocation<br>-Tune Price Ladder<br>-Plan Item Adjacency<br>-Tailor Ad Vehicle/Messaging<br>-Optimize Promotion/Offer<br>-Refine Location Format/Layout<br>-Expedite Order Fulfillment<br>-Expedite Order Shipping/Delivery<br>-Extend Return / Exchange Timeframe<br>-Escalate Issues<br>-Reverse Return / Cancel<br>-Credit Adjustments<br>-Expedited Parts Fulfillment / Shipping<br>-On-Site Service | Example Treatment Elements<br>-Channel Availability<br>-Agent Accessibility<br>-Priority Queuing and In-Store Service<br>-Own the Contact<br>-Voicemail Follow-up<br>-Route to Same Agent<br>-Segment Recognition<br>-Personalization<br>-Warm Transfers<br>-Surprise and Delights<br>-Proactive Follow-ups and Notifications<br>-Tailored Communication Styles<br>-Agent Empowerment<br>-Channel Utilization Incentives<br>-Self-Service Promotional Messages | Example Treatment Elements<br>-Best Offer<br>-Segment Recognition Programs<br>-Product Configurations<br>-Product Bundling<br>-Cross-Sell Offers<br>-Cross-Sell Messaging<br>-Up-Sell Offers<br>-Up-Sell Messaging<br>-Promotion Messaging<br>-Rebates and Incentives<br>-Special Financing Offers |
| Treatment Element Value Examples | -Characters: Y (Yes) / N (No) *(for example - Item inclusion in Assortment)*<br>-Numbers: .10, .20, etc. *(for example - offer discount)*<br>-Descriptors: Max25 (Maximum of 25) *(for example – key message elements for marketing programs)* | -Channel: W,S,C: *(for example– consumer channel preference identification)*<br>-Script Code: Sc124 *(for example – linkage to call agent or store associate dynamic guidance on Segment Driven Strategy)* | -Offer Code<br>-Campaign Identifier<br>-Content Management Identifier |

Figure 4    Example Treatment Taxonomy

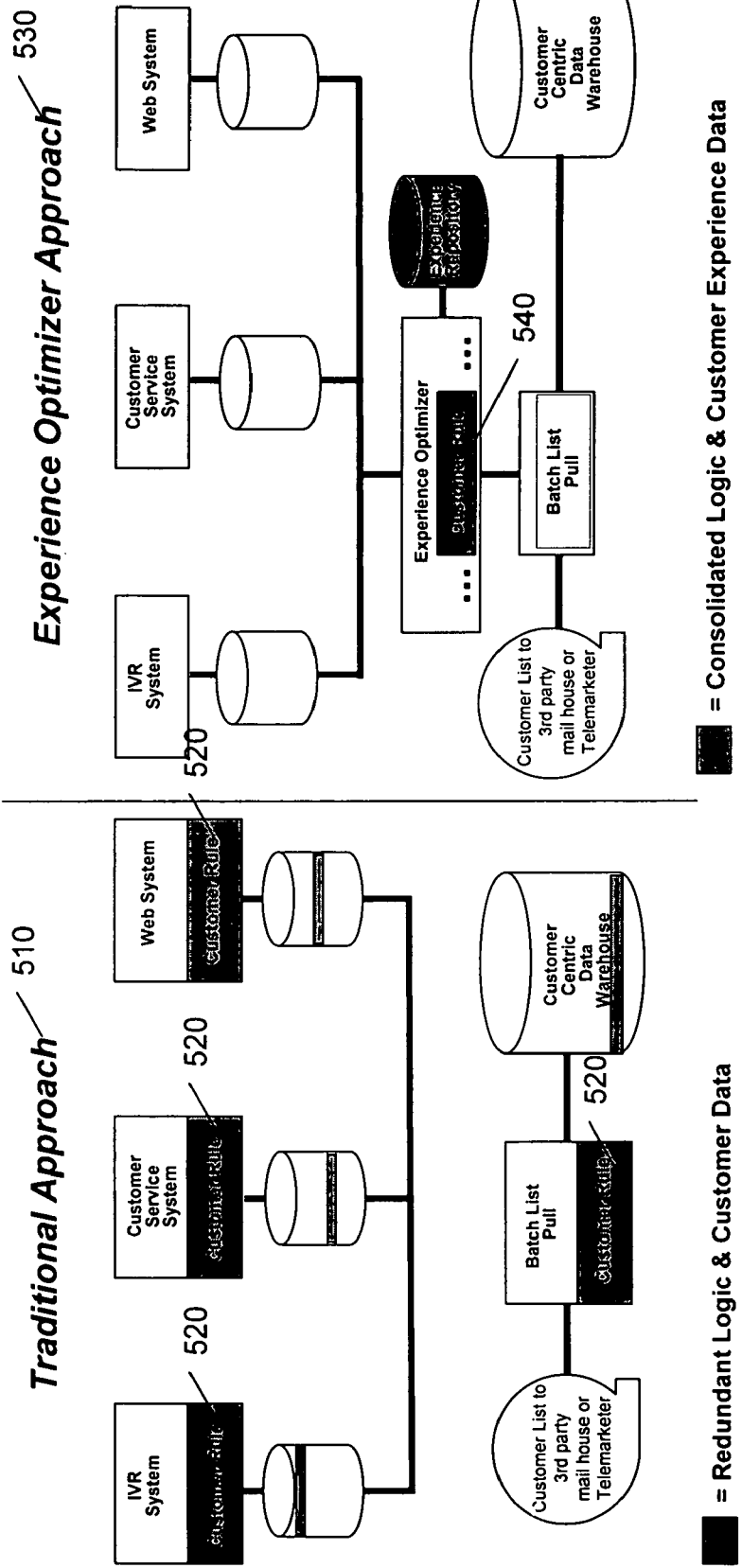
Figure 5  EO Consolidated Architecture Approach

1. Overriding Rules  /610

Rules governed by various federal laws, company policies or by credit/ risk related attributes of customers. These rules are basically applied to the whole population and global in nature. Each customer has to conform to these rules before other rules kicked off and processing starts.

Examples
1. All pander files (Do not call, No telemarketing, No communication from company etc. internal or external)
2. Credit Rating (bad credit history)
3. Bankruptcy (customer has filed for bankruptcy cover)
4. Fraud/ Delinquent Customers

2. Trigger Rules  /620

Rules triggered based on a change/ event in lifecycle of the customer. These events are not behavioral events and generally occur over a period of time. These events provide a good opportunities to convert into a product and service sale.

Examples
1. Change in address
2. Marriage
3. Customer Opening his/ her own business
4. Home Loan

3. Event Based Rules  /630

Rules kicked off after a service provider related event take place. These events are behavioral events and generally occur periodically during the relationship between a customer and an organization.

Examples:
1. Customer is looking for some additional products
2. Customer looks for add-on components with the existing services/ product he is enjoying
3. Customer just purchased a new service/product
4. Customer shows some kind of unhappiness with the current product/ service

4. Interaction Rules (CEW Rules) /640

Rules executed through the absence of previous processing categories. These may be behavioral cues and can be observed during the customer's relationship with the organization. These cues are usually mature in nature and can be determined through analytics, intelligence, or predetermined company rules

Examples:
1. Behavioral change in usage pattern
2. Natural upward product/ service migration
3. People of same profile migrating to new or add-on
4. CEW stated treatment data

Figure 6    Rules Processing and Categorization

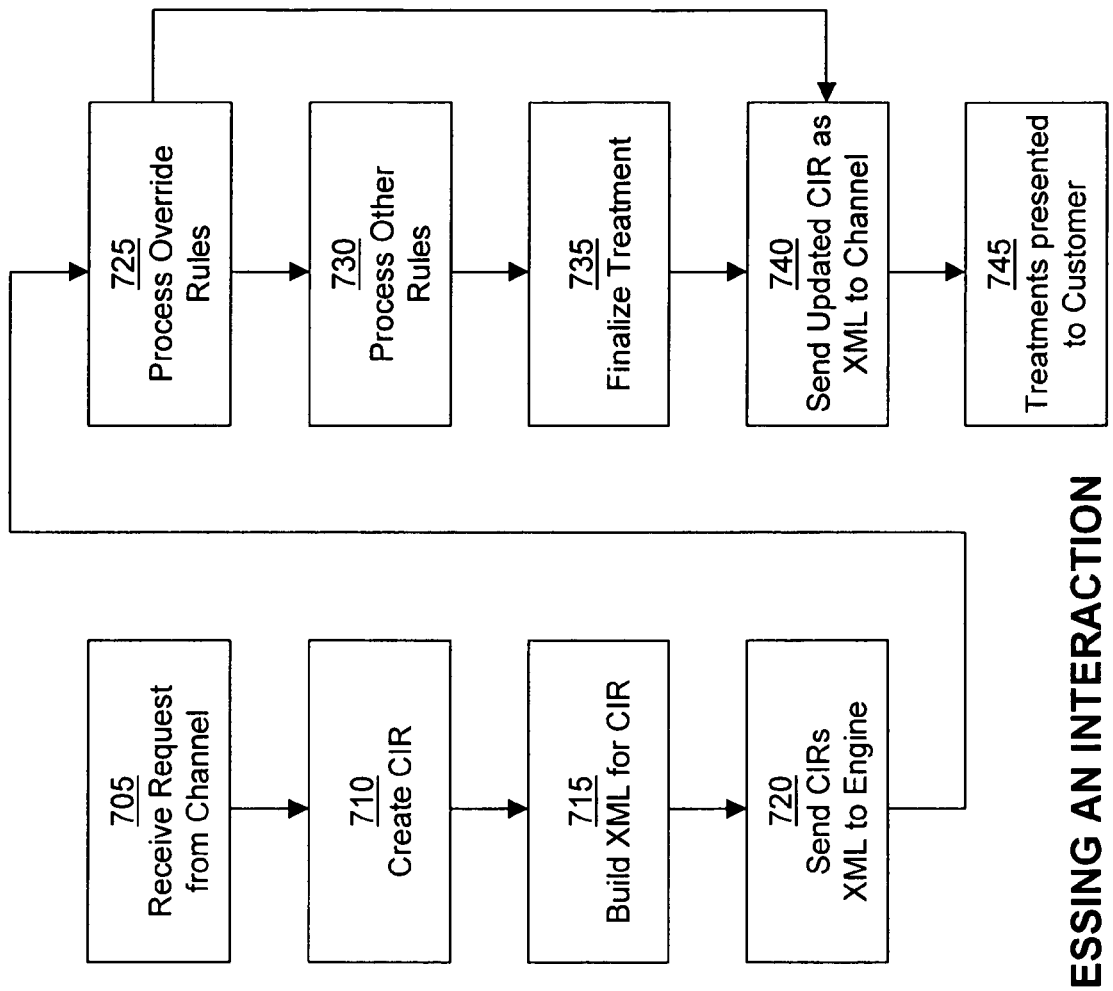
Figure 7    PROCESSING AN INTERACTION

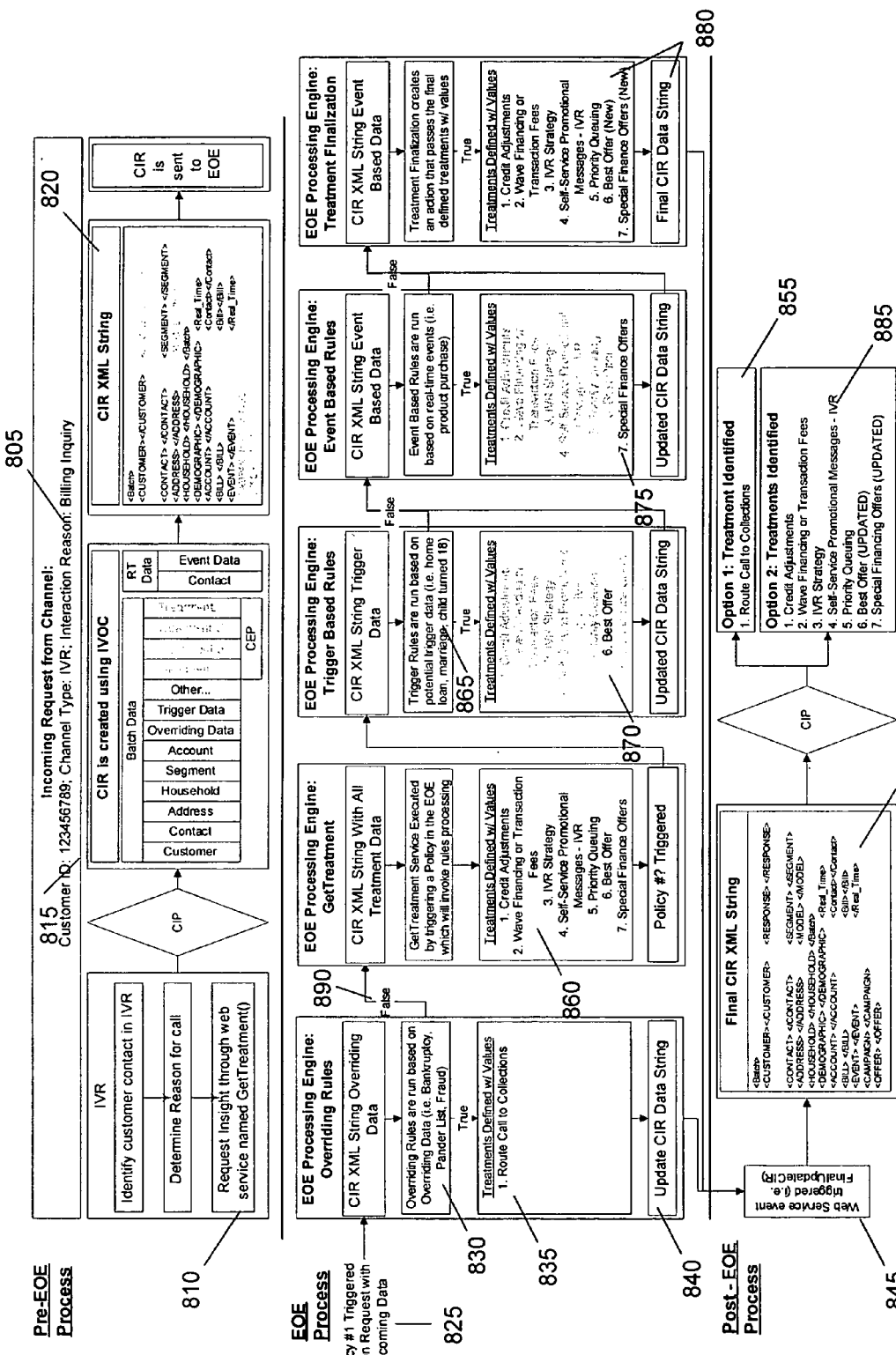
Figure 8  Engine Execution Process

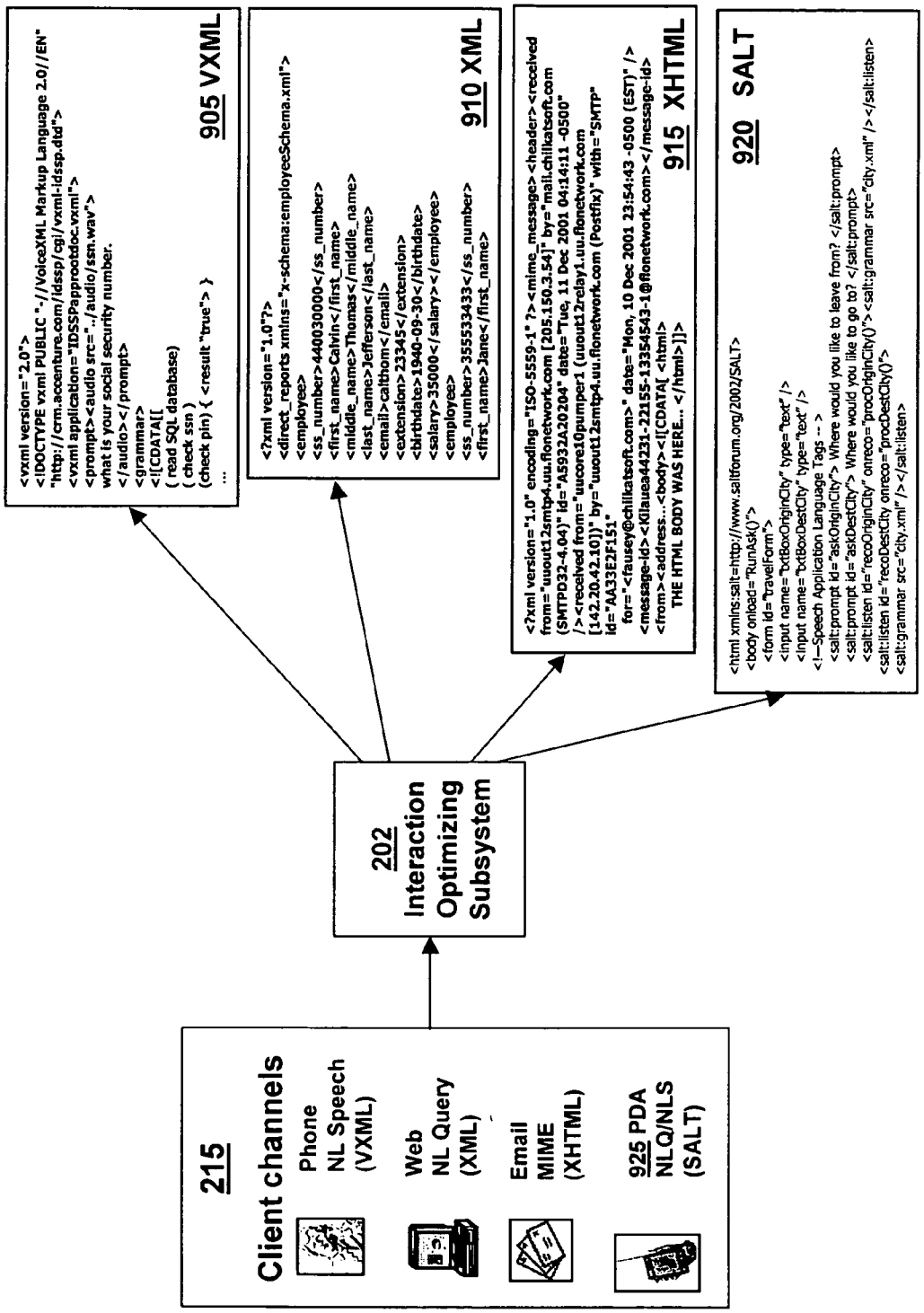
Figure 9   Example Channel-Specific Code Generation

ENHANCING INSIGHT-DRIVEN CUSTOMER INTERACTIONS WITH AN OPTIMIZING ENGINE

RELATED APPLICATION

This application is related to commonly assigned co-pending patent applications "Enhancing Insight-Driven Customer Interactions"Ser. No. 10/811,439 and "Enhancing Insight-Driven Customer Interactions with a Workbench"Ser. No. 10/810,910, both filed Mar. 26, 2004, and both of which are incorporated herein by reference.

FIELD OF THE INVENTION

This invention relates to customer relationship management ("CRM"). More particularly, the invention relates to a system, method and computer program for enhancing interactions between a customer and a company through the use of: (1) a guided customer experience management methodology, (2) a software application toolset that allows business users to analyze the effectiveness of previous treatments and define new treatments to apply during customer interactions, and (3) a rules-based engine for applying those treatments in real-time as customers interact with the business and capture performance data, regardless of the customer interaction channel.

BACKGROUND OF THE INVENTION

A. Implementing CRM Theories is not Readily Accomplished

A goal of CRM is to help a business maximize the value of its customer relationships by enhancing cost-to-serve and revenue opportunities. By better understanding customers' needs and the value they bring to the business, a company can tailor the way it markets, sells, and services customers so that customers who contribute to the profits of the business will buy more, but more profitable products or services, buy them more often, and continue to do business with the company. To put this model into practice, a company should be proficient in one or more areas. For example, a company may need to be proficient in: (1) defining a customer strategy; (2) aggregating customer data; (3) drawing insights into customers' needs based upon analysis of the customer data; (4) defining appropriate customer treatments based upon customer insights; (5) applying treatments in real-time or batch, regardless of the channel used by the customer to interact with the business; (6) capturing the results of the interactions and feeding it back into the insight process so more accurate assessments can be made in ensuing cycles.

Companies have had difficulty developing and implementing both individual proficiencies and end-to-end proficiencies required to achieve the goals of CRM. Some companies have developed customer data warehouses containing historical customer transaction data, sometimes appended with household data. Some companies have developed analytical programs that have run against the data warehouse to determine effective marketing programs. And finally, some companies have been able to take the results of customer insights to manually tailor interactions with customers through specific customer interaction channels.

Companies have struggled in the proficiency and process of defining a customer experience and associated treatments. Presently, there is no process to holistically define the customer experience across all contact points, products and services, and there are also no tools to capture and automate treatments in a systematized approach. Most organizations today determine experiences on an ad hoc basis and in a silo fashion across marketing, sales, and service. This ultimately creates inconsistent experiences and treatments across channels as well as increases maintenance of all the channel applications.

But while certain companies have had limited success at implementing some of the proficiencies individually, companies are challenged to implement all of the capabilities needed to completely realize goals of CRM. Companies have struggled to implement insight driven interactions. This includes a systematic, fact-driven process for defining customer treatments tailored to individual customer segments, applying the intended treatments in real-time (or batch) across the various interaction channels, and feeding back the interaction results to re-train the analytical models. They have not been able to leverage the process of defining intended customer interactions such that it actually feeds the data repository needed to drive the actual interactions. They have not been able to streamline the process of building analytical models and driving the results into interactions quickly enough to optimize the results. They have not had a centralized means by which they could define and implement intended customer treatments across all customer interaction channels.

B. Maintaining Treatments is Time Consuming

Since delivering the appropriate customer experience is essential to CRM, companies may desire to control the various interactions between a customer and the company in order to enhance or optimize the resulting experience. There are presently systems that assist a company in interacting with customers. For example, IVR systems allow a customer to use a telephone to find out a balance and payment due date as a type of self-service interaction. Or, a customer service representative may rely on a CRM software system to retrieve and store information about a customer when the customer calls about a problem. Unfortunately, these systems rely on their own rules processing and internal code/configurations to make interaction decisions based on customer insight. Since each business division and each contact channel has different requirements for an interaction system, each system is typically coded, modified and configured individually to meet specific business requirements. Once a customized system has been created, it requires continual maintenance and may be difficult and/or time consuming to recode, reconfigure or update. Whenever a modification to the system is to be made, a new process of defining requirements, developing designs, and building the modifications must take place. This is very time consuming and inefficient, especially for any systems that are tightly coupled with backend systems, and code that is not well documented or modularized, such as IVR systems. In addition, most businesses support more than one contact channel. Trying to create a consistent experience across more than one channel system (i.e. IVR, Web, Agent Desktop, E-Mail, Kiosk, etc.) requires code changes to occur on all channels which is again time consuming and inefficient. For example, an organization may want to present a certain type of offer to customers via an IVR system and a Internet website. Whenever a customization is to be made to how a customer can receive a specific treatment—such as receiving the same offer whether on the web or in the IVR—modifications must be made to the IVR system as well as to the web server. Modifying a number of channels to incorporate one change is inefficient and often error prone.

In addition, working across functionality is also inefficient and error prone. Because many organizations are aligned around channels (i.e,. IVR, Web, Agent) or functions (i.e., Marketing, Sales, Service) as opposed to customer or customer segments, the effort to define and build consensus, document, and act on consistent strategies is a challenge. Often, these barriers exist because of misaligned priorities (generate sales versus lower cost to serve versus maximize customer lifetime value), misaligned incentive programs (higher commissions for new sales versus retention cross sales activities), and/or focus on channel as "the in solution"—i.e., web. Aspects of the present invention facilitate breaking down these barriers by taking a broad perspective of the customer lifecycle, the ways to drive value across the relationship by focusing on marketing, sales, billing and service actions, as well as channels.

Because coding is involved when making changes to the web, IVR, agent desktop or any other channel, the change must be implemented by someone in the IT department of the business. Whenever, for example, a business' marketing department develops a new campaign and wishes to add a new customer treatment to a channel it may require two time-consuming steps in the implementation cycle by specialized IT resources: (1) translating the treatment into technical specifications that will meet the business outcomes for the target customer segment (e.g., increased customer satisfaction, increased sales, etc.), and (2) scheduling and completing the implementation of the request. Meanwhile the marketing department (or other team requesting the treatment change) must wait for the updates and modifications to be implemented.

The need for constant customizations and modifications also creates an opportunity for inconsistencies. Either the modification may not be made to all the interaction channels, or the new prompts and content may be added differently to each contact channel. Or, current systems for a channel may not offer the same capability as another channel. Additionally, if a customer repeatedly makes the same inquiry, the customer must still proceed through an entire menu for obtaining the desired response. This is also inefficient.

C. To Maximize Value, Customize the Choices Presented to the Customer

As previously mentioned, current customer interaction systems may be customized with options/treatments that are presented to the users. Some of these options may be based on characteristics of the calling customer. For example, in an IVR system, a customer may be able to press or say "1" to hear options in English and to press or say "2" to hear the options in Spanish. The customer's response then determines how the rest of the interaction proceeds (i.e., either in English or Spanish). While some of level of customization is available in existing interaction systems, a systematic approach that offers customization from a central location to all of the communication channels at once is not available.

What is needed is a methodology that can be used systematically and holistically to guide a company to evaluate, implement, improve, and maintain a CRM strategy that can gain and leverage insight about customers through their interactions with the company. What is also needed is a computerized toolset to present and document such a systematic methodology and capture the intended customer treatments for use in controlling the interaction with the customers. Furthermore, what is needed is a computer system that can leverage the information defined by the methodology when interacting with customers to enhance the experience across all interaction channels, where treatments can be quickly manipulated by business users.

What is also needed is a system that can derive insight from interactions to further enhance future interactions with customers. What is also needed is a way to easily, quickly and consistently make modifications to how the interaction with the customer will be delivered. What is needed is a system that can be used by a non-technical employee who understands the business goals and speed-to-market urgency rather than requiring generic programming from an IT professional. When a change is made to the IVR treatments, for example, what is needed is a way to readily make the same change to the website, agent desktop, IVR and all other channels simultaneously with little modifications to the systems.

SUMMARY OF THE INVENTION

The invention relates to consistently enhancing the customer interaction experience across all channels through which a customer interacts with a company. It includes the methods, systems, and computer programs needed to enhance customer experiences by receiving customer requests from one of a variety of customer interaction channels. The customer may be identified and a central processing engine may choose a treatment that is appropriate for that customer. The customer interaction will be processed based on the chosen treatment and the customer interaction results are then captured so that they can be analyzed and used to define and enhance future interaction experiences.

The invention is preferably a solution leveraging a method, a computer system, and a computer programming that includes: (1) evaluating a customer strategy; (2) identifying customer segments from a customer base; (3) translating that customer strategy into an interaction strategy; (4) defining and automating experiences based on the strategy; (5) delivering and executing enhanced treatments to customers; and (6) monitoring the results of the customer interactions to enhance (i.e., optimize, tune or improve) future interactions. A computer aid may preferably guide a user through some of these steps. That computer program may preferably allow a business-user to set values needed to define the series of experiences and capture the preferred treatments in a database to direct the customer interaction. A modular, rules-based, engine preferably performs the processing required to deliver tailored customer experiences during interactions with customers across the available customer interaction channels, leveraging the values set through the computer aid. In addition to full-service channels (where a customer interacts with a company representative), the engine may also support self-service interactions, such as a customer using a phone keypad and an IVR system to retrieve account information. The rules processed by the engine may be based on insights gained by assessing prior customer interactions and associated customer behavior and be used to generate insight to control future customer interactions. The rules may also be based on what has been assessed about customers so that a targeted customer treatment can be applied to each customer based on insight.

BRIEF DESCRIPTION OF THE DRAWINGS

These and other features, aspects, and advantages of the present invention will become better understood with reference to the following description, claims, and accompanying drawings where:

FIG. 1 is a flowchart of the major steps involved in one preferred embodiment of the invention.

FIG. 2-1 is a block diagram of a preferred system for enhancing customer interactions according to one embodiment of the invention.

FIG. 2-2 is a block diagram illustrating a preferred technical architecture for the system from FIG. 2-1.

FIG. 2-3 is a diagram of an example CIR structure.

FIG. 3-1 illustrates an opening screen of a workbench tool that is one embodiment of the present invention.

FIG. 3-2 is a screenshot of the area in the workbench tool shows the tasks available for each of the phases.

FIG. 3-3 is a screenshot of the workbench area that lists the current segments by name and with a short description.

FIG. 3-4 is a screenshot of the workbench area that is a report showing details of one segment.

FIG. 3-5 is a screenshot of the workbench area displayed when a user drills down through the report to discover the percentage of customers in each segment.

FIG. 3-6 is a screenshot of the workbench area displayed when the user drills down even further to see the population for each segment.

FIG. 3-7 is a screenshot of the workbench that allows a user to evaluate and create sub-segments (segments within segments).

FIG. 3-8 is a screenshot of the workbench that allows the user to identify (based on the existing lists of industry specific interaction reasons), add and capture all the current reasons customers call the organization (interaction reasons).

FIG. 3-9 is a screenshot of the workbench area that allows a user to set up the current channel mix.

FIG. 3-10 is a screenshot of the workbench area that illustrates that the current channel mix can be shown by count as well as by percentage.

FIG. 3-11 is a screenshot of the workbench area that shows how information is documented regarding the experiences and capabilities that occur on each channel for each interaction type.

FIG. 3-12 is a screenshot of the Enterprise Value Calculator that helps evaluate key value drivers through cost and revenue metrics.

FIG. 3-13 is a screenshot of the inputting data in the Enterprise Value Calculator.

FIG. 3-14 is a screenshot of an output report from the Enterprise Value Calculator.

FIG. 3-15 is a screenshot of the interaction reasons ranked and the ability to use or execute on one of these interaction reasons.

FIG. 3-16 is a screenshot of the workbench area that displays the future ('to be") channel mix entered by interaction reason and segment.

FIG. 3-17 is a screenshot of the workbench area that depicts the industry specific treatment taxonomy and shows the ability for a user to add, modify, or delete treatments.

FIG. 3-18 is a screenshot of the workbench that illustrates the ability to create codes and values for each treatment.

FIG. 3-19 is a screenshot of the workbench that allows a user to rank or prioritize treatments.

FIG. 3-20 is a screenshot of the workbench area that is used to capture new future experiences for each segment, interaction reason, and channel.

FIGS. 3-21 and 3-22 are screenshots of the workbench area that allows the user to define and setup the treatment automation by assigning values to interaction reasons, and segments.

FIG. 3-23 is a screenshot of the Experience Monitor and its dashboard.

FIG. 4 is a sample listing of the treatment taxonomy leveraged within the workbench.

FIG. 5 is an illustration of the impact on consolidating code modification by moving the treatment logic to a single location.

FIG. 6 provides an overview of the rules processing and methodology for the Optimizer Engine.

FIG. 7 is a flowchart of the steps taken during an interaction with a customer according to one embodiment of the invention.

FIG. 8 shows two example of an end-to-end solution using the Experience Optimizer Engine.

FIG. 9 illustrates how one preferred embodiment of the invention creates code appropriate to a certain channel.

FIG. 10 illustrates how the rules engines leverages overriding rules (such as override rules, trigger rules and event-based rules) and workbench-created interaction rules to choose treatments for a customer experience.

DETAILED DESCRIPTION OF THE PREFERRED EMBODIMENTS

In broad terms, the present invention is a method, system and computer program that a company may use to maximize the value of its various interactions with its customers. Certain aspects of the invention include: (1) the methodology itself, (2) a software workbench that guides a user through the methodology and assists the user with setting up interaction rules, and (3) a computer system that uses a centralized, channel independent, interaction engine with the interaction rules to customize/enhance the interactions with customers. In some embodiments, the interaction with the customers is improved after insight is derived from past interactions.

Figures 1, 3:
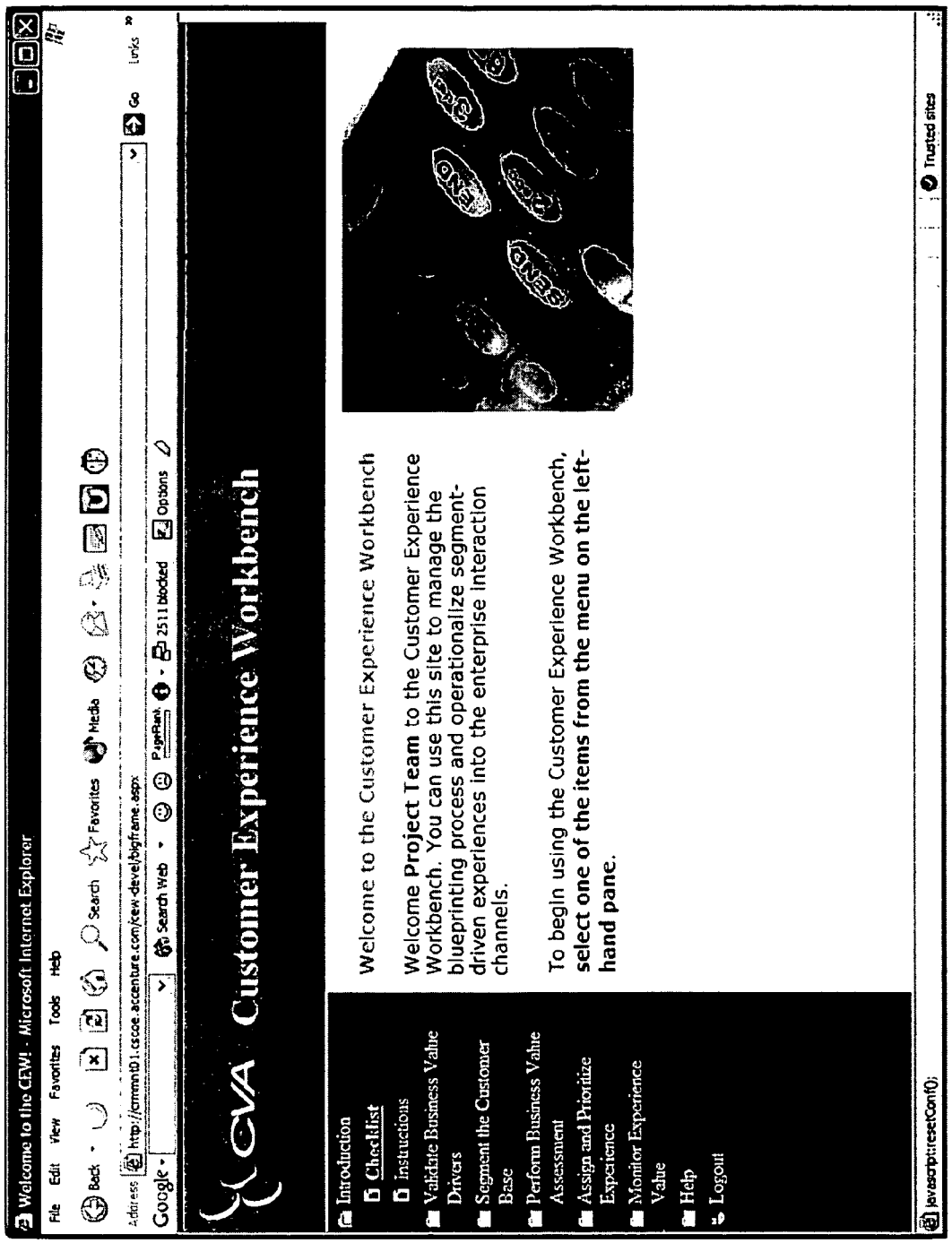

FIG. 1 is a flowchart of the major steps involved in one preferred embodiment of the methodology. Using this holistic methodology, a company may intelligently apply CRM strategies to its interactions with customers by enhancing or customizing those interactions. While a company may not perform each of the suggested steps, or may perform some of them in parallel rather than sequentially, in the preferred embodiment, a company begins by evaluating its customer strategy 110. Then a customer segmentation may be performed on an organizations customer base 120. Based on certain value opportunities, an interaction strategy may be formulated 130. Correlated to this strategy, a series of experiences and treatments may be defined, prioritized, and automated 140. Each customer experience and treatment may then be delivered and executed 150 through an Optimizer Engine. This may enhance the customer's experience based upon the original defined experiences. By monitoring and gathering the results of the customer interactions 160, the company may derive additional insight in order to improve any of the previously mentioned stages of the process.

Figures 2, 3:
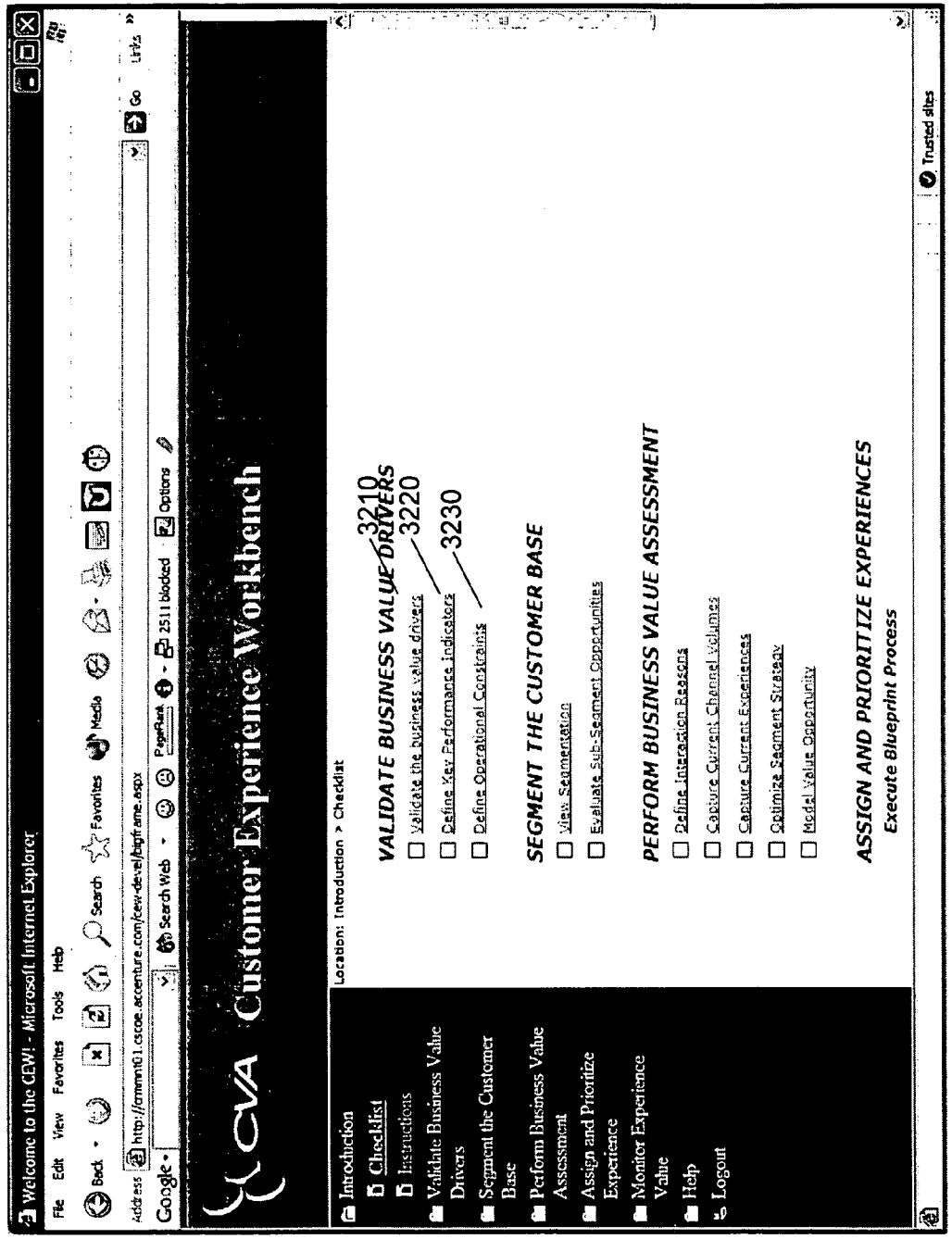
Figure 3:
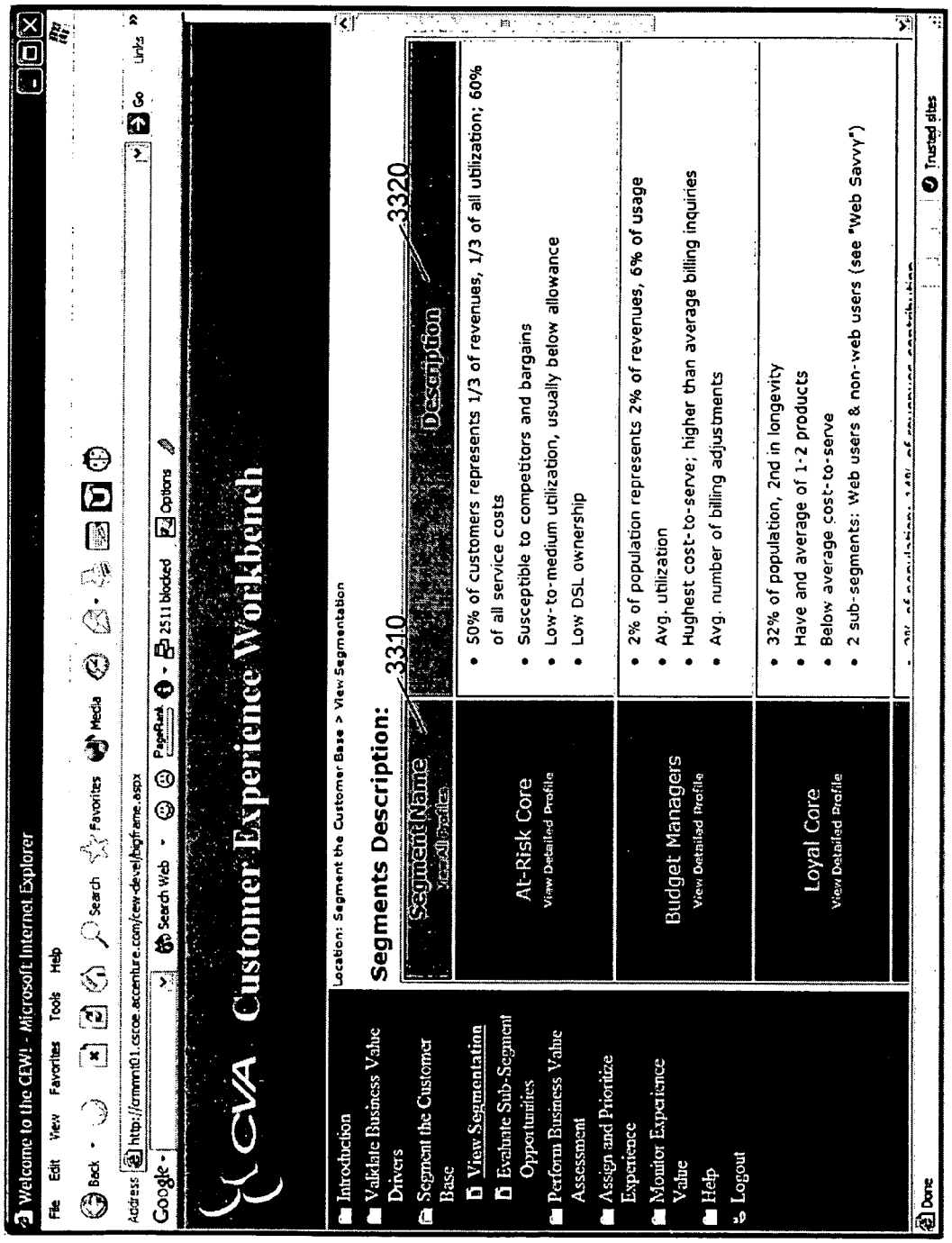

FIGS. 2-1, 2-2 and 2-3 illustrate the technology that may support the methodology outlined in FIG. 1. FIG. 2-1 shows the system as a series of interrelated components. As shown, the system may be divided conveniently into a workbench analysis subsystem 200 (i.e., the software workbench) and an interaction optimizing subsystem 202 (i.e., the system with the interaction engine). In one embodiment, the workbench analysis subsystem 200 is leveraged to evaluate the strategy 110, to identify the segments 120, to form the interaction strategy 130, to define the experiences 104 and perhaps to monitor the results 160. This subsystem consists preferably of a personal computer (or other computing platform) 204 running a software workbench application 205, which is in communication with one or more databases 210 including the Customer Experience Repository 210.1 which is where the Workbench stores its data.

The interaction optimizing subsystem 202 is preferably used to apply and execute the experiences 150 during interactions with customers. It consists preferably of a technical architecture of one or more databases 210 in communication with a web services layer 225 and a set of common customer services 230. The web services layer 225 may be based on Microsoft's .NET architecture or other architecture platforms. From the services layer 225/230, a Customer Interaction Record 240 may be used to transfer data to and from an experience optimizer engine 245, which is preferably built around a rules-based engine. The experience optimizer engine 245 may use the customer treatment data stored in the Customer Experience Repository 210.1 by the workbench analysis subsystem 200 in order to customize/optimize the interactions with customers.

FIG. 2-2 is a block diagram illustrating a preferred technical architecture for the system from FIG. 2-1. The Channel Technology component 215 may be any interaction channel that a customer may interface with an organization. This includes self service and non-self service capabilities. Examples include, but are not limited to, Agent Desktop (i.e. Siebel CRM System, SAP CRM System), IVR/Speech Applications (i.e. Avaya Conversant, Nortel Periphonics, Nuance, Speechworks), Web Servers/Applications (i.e. Microsoft IIS), E-Mail Management (i.e. Kana ERMS, Siebel Mail, Microsoft Exchange) and other channels including Point of Sale, PDA, and Kiosk. The services layer 225, 230 may be the underlying architecture to seamlessly interface multiple channels using the same protocols and common services. In one embodiment, the Services Layer is built leveraging Microsoft's Web services and .Net technology. The Customer Interaction Record (CIR) 240 may be a string or record of customer information generated to create a "Profile" of the customer for the purposes of providing up-to-date, insightful, and relevant information between the Services Layer 225/230 and the Engine 245. In one embodiment, the Engine Technology 245 is built on Microsoft's Biztalk 2004 rules engine and leverages already pre-defined policies, rules, vocabularies, and Net classes. The Customer Experience Repository 210.1 is preferably a database that maintains all of the treatment data that may define a customer experience. Ultimately, any data stored in the Workbench 205 preferably will be captured in this Customer Experience Repository. The Technology for the Workbench is .Net ASP web pages hosted on a Microsoft web server and runs a customized workbench application that captures segments, interactions, treatments, and experiences.

FIG. 2-3 is a diagram of a preferable example CIR 240 structure The Customer Interaction Record may aim at collating real-time 246 and batch attributes 242 of the customer to provide a summarized view of the customer. This summarized view will be used by the Experience Optimizer Engine (EOE) to determine the ultimate experience for a customer and to communicate the necessary customer interaction information to the appropriate customer interaction channel 215 through the Services Layer 225/230. This CIR is an XML structure and would be generated through a web service request and would interact with the Optimizer Engine through web services. The CIR may include a combination of Customer Definition Data (e.g. name, address); Business Transaction History (e.g. Customer Purchase History); Customer/Channel Preference Data (e.g. stated and implied preferences); and Channel Interaction Data (e.g. interaction channel choice and frequency), etc. The Customer Interaction Record ("CIR") may be broken down into three sections: a batch data section, a customer experience packet (CEP) section, and a real time data section. Fields in the CIR may be retrieved from a customer experience repository 210.1 or other customer centric databases 210.2. Fields in the batch data section of the CIR may include a customer field, a contact field, an address field, a household identification field, a segment identification field, account information, overriding data, trigger data, and the like. The Customer Interaction Record may include a customer experience packet ("CEP") 244 for each treatment to be presented to the customer during the interaction. As will be described below, the treatment data may be populated by the optimizer engine 245 to customize the experience for the individual customer. The real time data 246 portion of the CIR 240 may consist of fields that relate not to the customer's historical information, but to real time conditions, such as the current interaction reason, web click stream history, or the identification of a purchase during the existing transaction. As is illustrated in FIG. 2-1, the CIR 240 may be used to pass information between the optimizer engine 245 and the services layer 225/230. The CIR 240 may also contain data resulting from certain customer scores such as a credit risk score. In one example, leveraging this type of scoring data may allow the engine to determine if a customer is eligible for an interest free financing offer. There are many different types of customer scoring that can be leveraged to determine the appropriate treatments.

Phase 1: Evaluating a Customer Strategy (Step 110)

Now that the components of the experience optimizer engine 245 have been presented, the reader may better appreciate how treatments can be personalized for each customer with the intention that the customer's experience will be enhanced. Such enhancement is not made haphazardly. Rather, as FIG. 1 shows, the application of the rules to the treatment data 150 is a function of the preliminary analysis 110-140. FIGS. 3-1 through 3-23 show several screen prints from the workbench application 205 that is preferably used to perform such analysis. These figures show only one representation of the various aspects of the present invention. The aspects may be incorporated as part of other software systems using various techniques well known to those skilled in the art. While the screen prints in FIG. 3 show the present invention as an end-to-end solution, one skilled in the art will recognize that the features offered by the present invention may be implemented as one or more components in a company's present enterprise system.

In one embodiment, certain aspects of the invention are built within a software application known as the Customer Experience Workbench. This application has been discussed in FIGS. 2-1 and 2-2 as the workbench analysis system 200. Generally, the workbench is a software product that may guide a user through the analysis steps of the invention's systematic methodology and may assist the user with defining treatments for customer interactions. FIG. 3-1 shows the entrance page for the workbench after the user logs in. (The user may be a marketing manager, business analyst or other non-IT employee of the company. However, the company's IT personnel as well as independent contractors or consultants may also use the Workbench to set up and to maintain the system.) Along the left side of the screen, the various phases of the methodology (discussed above and shown in FIG. 1) are shown as folders. As the differences between the folders in FIG. 3-1 and the flowchart of FIG. 1 show, the present invention may be described using differing terminology. Each of the folders from FIG. 3-1 may contain one or more checklists or other work aids that may be accessed via the workbench tool. FIG. 3-2 shows the workbench's checklist of tasks that are available to the user. As the user progresses through these tasks, they can be displayed as completed through the use of checkmarks in the appropriate boxes.

The first step of assisting a company to implement insight-driven interaction may be to evaluate a customer strategy for the company (110). This step gives an organization the chance to review and enhance its customer strategy for marketing, sales, service, etc. to answer questions such as "What markets or distribution channels support future growth?" and "How are products and services driving value from customers?" During this step, organizations may identify projections and assumptions around cost-to-serve and revenue opportunities so that they can envision and focus on the value levers that help drive key customer centric costs and revenue strategies. In one embodiment, this strategy may be subdivided into three tasks, as shown in FIG. 3-2. First, the business value drivers may be validated 3210. Identifying both financial and non-financial value drivers may help identify, drive, and prioritize areas where the organization can impact its bottom line. To accomplish this, a project team may review short and long term growth projections in the areas of marketing, sales and service (i.e. customer retention projections, cross-sell/up-sell rates, self-service projections, etc.) They may assess all potential value drivers and the manageability of these drivers including timeframes to execute, potential costs to implement and impact on an organization and customer satisfaction. They may also prioritize value drivers based on results from assessments or sensitivity analysis.

The second step may be to define and gather data for key performance indicators ("KPIs") 3220. Identified KPIs can be utilized to better align organizations goals with a customer centric strategy. It is important to understand how KPIs are directly affected by cost components, potential treatments, or other customer focused initiatives. Some broader KPIs may be metrics such as "cost to serve" or "cost to market" while more detailed KPIs may be "cost per campaign" or "revenue per subscriber". Understanding the impact that a customer strategy may have on a company's KPIs may be a continual process that is revisited throughout a customer blueprinting process.

The third step may be to define various types of operational constraints 3230. Operational constraints may pertain to operations, such as whether a product is or is not available in a market area. Operational constraints may also be directed to policy constraints, such as indicating that accounts in collections should be redirected to the collections department. Operational constraints may also be strategic imperatives, such as to gain market share or to gain share in a specific ZIP code region. All such constraints may impact the way in which certain customers may be treated.

Phase 2. Identifying Customer Segments (Step 120)

Once the strategy has been evaluated 110, the next phase may be to identify the customer segments 120. Customer segmentation arranges customers, or a representative sample of customers, into groupings of customers (of perhaps six to nine groups, for example) where the customers in a given segment share one or more similar characteristics. These segmented groups may be used to drive an interaction strategy and/or design.

The consulting team or company representatives may choose to use segmentation data that already exists or that the company may create itself. It may also be decided to have the consulting team or another third party segment the company's customer population based on a number of demographic and behavioral characteristics. While there are various ways to generate the customer segments, the utility patent application titled "Multi-Dimensional Segmentation for Use in a Customer Interaction", (Ser. No. 10/302,418, filed on Nov. 22, 2002, which is incorporated herein by reference) teaches how to achieve better results by segmenting the customers across more than a single dimension and is incorporated herein by reference. In connection with the multi-dimensional segmentation taught in that application, the utility application titled "Standardized Customer Application And Record For Inputting Customer Data Into Analytic Models" (Ser. No. 10/302,337, filed on Nov. 22, 2002, which is incorporated herein by reference) teaches one approach to using standardized flat records as a step in the segmentation and/or customer interaction procedures. FIG. 3-3 shows the area in the workbench that may be used to capture the segments by name 3310 along with a short description 3320.

Figures 3, 4, 5:
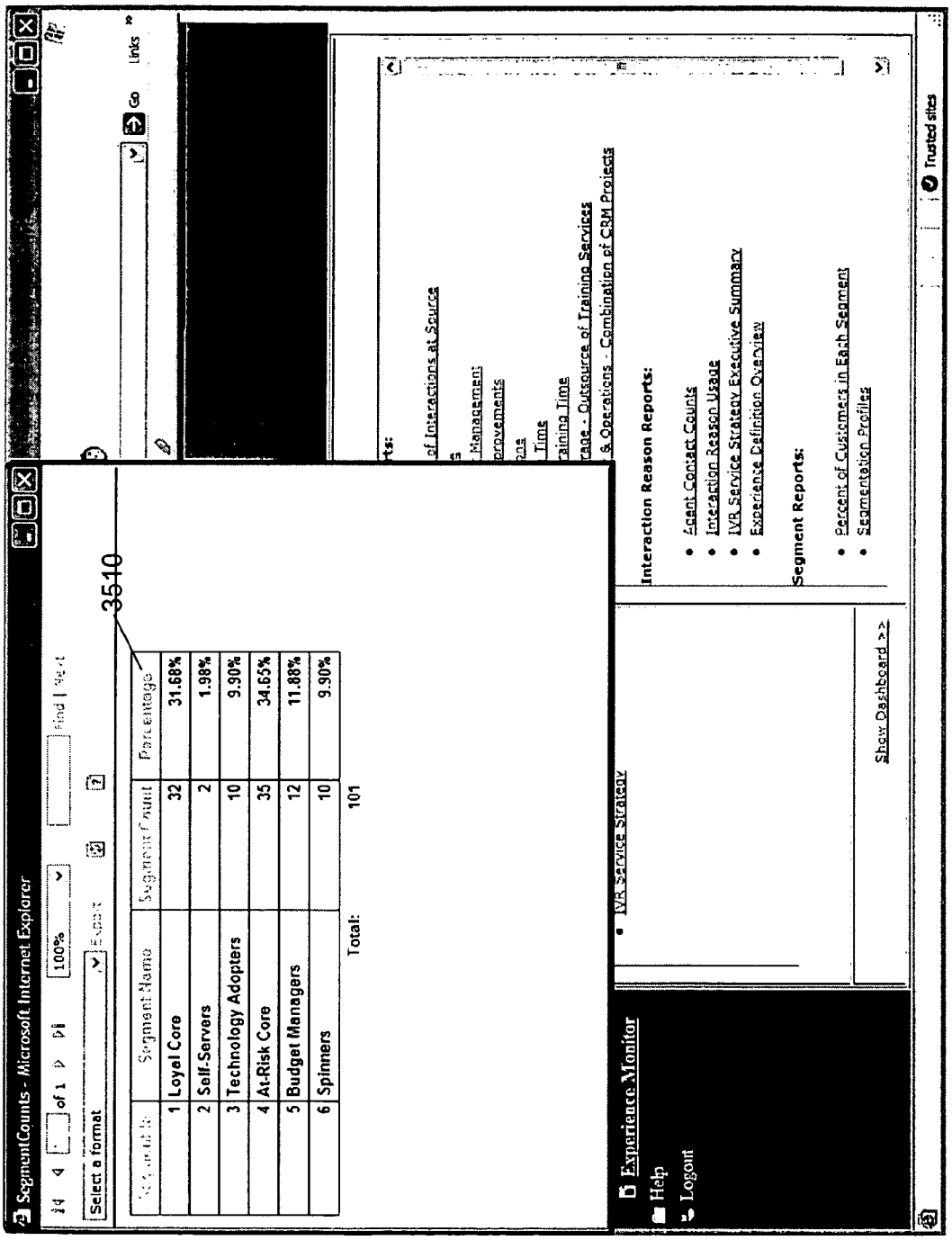

There may also be the ability in the workbench to drill down from the screen shown in FIG. 3-3 to report on specific details about the segments. FIG. 3-4 shows how the workbench may offer a means to report more detail about the segments that have been defined. FIG. 3-5 shows how a user can obtain reporting details around segments, not characteristic specific 3510. As FIG. 3-6 shows, a user may drill down within the segments to receive further detailed information about the specific customers who fall within that segment 3610.

Beyond identifying segments, there may be needs to create sub-segments as illustrated in FIG. 3-7. The list of questions provided by the workbench concerning the various types of operational constraints may be one method in deciding whether sub-segments may need to be developed. Sub-segments may be formed, for example, when the company wishes to target a specific group of customers within a segment, such as in response to a competitor's offer in a specific region in the country. In this example, an organization may create a sub-segment called "<Segment name> East" that presents specific offers to only people in a segment that live on the east coast.

Phase 3. Forming an Interaction Strategy (Step 130)

The segmentation phase 120 may be followed by the phase to form an interaction strategy 130, which may be handled by performing a business value assessment. In one embodiment of the workbench, there are five tasks in this phase (that are listed as tasks in the screen of FIG. 3-8), namely: define interaction reasons 3810, capture current channel volumes 3820, capture current experiences 3830, optimize (i.e., enhance) segment strategy 3840, and model value opportunities 3850. This phase gives the organization the chance to strategically evaluate the reasons as well as the ways they are currently interacting with their customers. It also allows them to identify a baseline for the way they are interacting with customers today. "Define interaction reasons" 3810 provides a way to capture each and every method a customer may interact with the organization. The workbench 205 tool may have a predefined, industry specific, list of interaction reasons that can immediately be leveraged by a team. FIG. 3-8 illustrates a list of predefined interaction reasons for telecommunications 3860 as well as the ability to read descriptions of the interaction reasons or delete them as appropriate 3870. A user may also want to add new interaction reasons based on their business 3880.

The step referred to as "Capture current channel volumes" 3820 allows an organization to capture the number of times a segment of customers may contact an organization for each interaction reason through each channel. This volume count is illustrated in FIG. 3-9 and percentages of these counts are illustrated in FIG. 3-10. "Capture current experiences" 3830 allows an organization the ability to define the current functions, capabilities, and potentially content that segments of customers are experiencing for each interaction reason, on each channel. In FIG. 3-11, there is shown the ability to document the current experiences 31110 for each segment and interaction reason as well as document the capabilities 31120.

"Model Value Opportunity" 3850 is a value calculator that allows an organization the capability to identify the cost and revenue value levers that drive the business to deliver specific treatments to segments of customers. FIG. 3-12 illustrates the area in the workbench 205 tool in which data may be inputted, such as cost/revenue metrics 31210 and value lever assumption 31220 (i.e. increase self service by 20%). Examples of cost metrics include the current hourly wage of an agent, the cost per IVR interaction, or the total number of interaction that occur within a year. Examples of revenue metrics may be the average revenue per customer or the margin on revenue. Examples of value levers may include, % expected to increase cross-sell rate or % expected to increase calls that will be completely answered within the first interaction (i.e. first call resolution). There is also the ability to view reports once data has been inputted 31230. FIG. 3-13 depicts some of the more detailed interaction metrics and a method to input the data 31310. FIG. 3-14 illustrates a reporting screen called Summary Total Benefits 31410 that is calculated based on all the inputted cost and revenue data as well as value levers. The output of this report shows the potential benefits that could occur if specific value levers, such as self service, are increased or decreased from X% to Y%.

FIG. 3-15 shows how the workbench 205 may assist in the ranking of interaction reasons as well as the selection of which interaction reasons an organization will focus on automating treatments for. One step in managing interaction reasons may be the process of determining which interaction reasons have the most impact on an organization (i.e. 30% of all calls are billing inquiry), rank 31520 these interaction by importance to the organization and finally select which interaction reasons to use 31530 or assign treatments to. In the screen shown in FIG. 3-15, a user has ranked her top four interactions to focus on. For example, out of all of the possible interactions that occur between a customer and the company, the business user has identified "Bill-General Inquiry" 31520 to be the first interaction to focus on. She has also checked the use box 31530 to illustrate that she wants to associate treatments to apply to this interaction reason. By allowing the user to prioritize any number of interactions, the company may start affecting specific interactions slowly and then build up to apply treatments to more interactions over time.

FIG. 3-16 depicts an area in the workbench 205 where a future channel mix may be defined 31610. In the embodiment shown in the figure, only the previously selected interaction types are included in defining the future channel mix. This definition process allows an organization the ability to set goals of which channels it wants certain types of interaction to communicate through. By completing this future channel mix process, an organization can view reports on where it is today versus what its goals may be in driving certain types of interaction to specific types of channels.

Phase 4. Defining and Automating Treatments (Step 140)

Once the segments, channels and interaction reasons have been prioritized by the user, the next phase of work is preferably to define these experiences or specific treatments so that they can be applied and automated through the engine 245. As shown in FIG. 3-17, the workbench 205 may allows business users to easily add 31720 and define various treatments. It also allows user to add or modify values and codes associated with each identified treatment, as illustrated in FIG. 3-18. For example, a treatment may have the code of S1 which means "self service". The IVR may then use the code S1 to illustrate that a person associated with Si should receive an IVR script that pushes for customers to remain in the IVR and complete self-service transactions. A code of A1 or "Agent" may mean for the IVR to route the call directly to an agent. Business or technology users can assign or modify treatments in real-time as changes to the process are desired. For example, if a certain product offer is not gaining acceptance from a segment of users, that same product offer can quickly be offered to another segment of customers. However, treatment codes and results must then be understood by the channels for these changes to take place. This phase of managing treatments also allows users of the workbench 205 to rank and select which treatments should be leveraged by the engine 245. This screen in the Workbench and process is illustrated in FIG. 3-19. While multiple treatments may be defined and ranked, it is not until the user identifies specific treatments to be 'used' that the engine will then execute against it. This means that the treatments and values are stored in the Customer Experience Repository 210 and the channel technology 215 understands the values as defined in the workbench 205.

The final preparation in the Customer Experience Workbench 205 may be to assign the future experiences and treatments 32010 (of FIG. 3-20). The first step (defining future experiences 32020) allows the project team or company representative to define the future experiences for each segment of customers 32040, for each interaction reason 32050, and within each channel. During this step a business user may leverage the workbench 205 to capture the requirements regarding the future type of experience 32060 the selected segment should have on each channel and the capabilities or functions 32070 that should apply to that segment 32040 and that interaction reason 32050. There is also the ability to tie experiences to specific types of content 32080 such as .wav files for the IVR or .jpg files for the web.

Now that all the segments, interactions, channels, and treatments are defined, they may be tied together to automate the treatment. This may happen in the define treatment automation page of the workbench 205, as is illustrated in FIG. 3-21. FIGS. 3-21 allows a user to define an experience by selecting a segment 32110, interaction type 32120, channel 32130, and treatment 32140. Finally, by selecting the 'details' link 32150, the user may be enabled to determine the exact treatment for the customer segment, as illustrated by FIG. 3-22. For example, during the define treatment step earlier in this workbench process (as described above) two codes were associated with a treatment called 'IVR Agent Availability', namely S1 for self service and A1 for agent assisted. FIG. 3-22 may be the location within the software application where a user may specifically select which treatment a segment should receive (i.e. sent directly to an Agent or given a self service menu in the IVR). As illustrated in the example shown in FIGS. 3-21 and 3-22, the workbench has defined a customer segment named "Loyal Core" (see 31210). When the "Choose Interaction Reason" field 31220 is used to select the "Bill: General Inquiry" reason, the treatment element "IVR Agent Availability Treatment" may be chosen for the IVR channel 31260. Using the "Detail" button 31270, the user may determine that a customer in the "Loyal Core" segment, about a "Bill: General Inquiry", will leverage the "IR Agent Availability" treatment which is being configured (see 32240 in FIG. 3-22) to send the customer directly to an agent.

As all the segments, interactions, channels, and treatments are defined and tied together, the data is captured and stored in the customer experience repository 210.1 to be used to support future customer interactions. By leveraging this repository 210.1, the present invention may allow a company to successfully define holistic and granular strategies. Without assistance from comprehensive information stored on the experience repository, a company may flounder in trying to make sense of and organize the myriad customer interactions and responses that take place across its various contact channels. Thus, the experience repository 210.1 may make creating a blueprint of the company, its interactions, and its marketing strategies easier or quicker, or the repository may ensure that the resulting blueprint is more robust.

Now that the treatments and experiences have been defined, there is a gap analysis 32210 step that may be undertaken. The gap analysis may be used to define the differences between the existing experiences in each channel and the future experiences. This information may assist in the prioritization of any new implementations of experiences and treatments.

Next, a user may begin planning the implementation of all the experiences and treatments with all the external applications including the Experience Optimizer and each of the channels identified during the blueprinting process. The first task in this step may be to begin reconciling the future experience plans as defined in the blueprint with the implementation teams. This reconciliation process may assist in determining the complexities, implementation timelines, and priorities. The next task may be to prioritize the experience capabilities based on costs, benefits, complexity, etc. The last task in this step may be to create a benefits roadmap which is a timeline that illustrates when capabilities will be launched and overall benefits expected based on implementations of capabilities.

The last step in the workbench 205 before the ongoing monitoring of the experiences may be to build rules in the Experience Optimizer Engine 245. While this step is illustrated as part of the workbench process, the engine rule building happens outside of the workbench and within the Experience Optimizer Engine 245 itself. Defining and building these rules in the engine are described in further detail during Phase 5, below.

Phase 5. Delivering Rules and Executing the Optimizer Engine to Apply the Defined Experiences During Interactions with Customers (Step 150)

The previous phases shown in FIG. 1 (steps 110 through 140) may be handled by the consultant or business user leveraging the workbench tool 205. In contrast, the act of defining and executing the experiences during interactions with customers 150 may be performed by a process/technology project team and executed by the Interaction Optimizing Subsystem 202 and its Experience Optimizer Engine 245.

The Experience Optimizer Engine (EOE) 245 is a software component that may ensure that the blueprinting exercise that occurred within the workbench 205 is applied consistently across all channels to achieve the customer profitability objectives, as defined by the organization. For each interaction, it may resolve the customer segment, current transaction, and current channel in order to determine the appropriate predefined treatment protocol to be executed. It can be invoked to deliver treatments to the channels, including messages, routing instructions, service options, and/or product offers. The EOE 245 may execute rules that have been created for all customers. While the Workbench defined specific treatments based upon customer segment, interaction type and interaction channel, the EOE may identify customer attributes or events that require pre-emptive treatments based on this data. For example, John Doe may be a customer that falls in a financial segment that has been defined by the Workbench to get a "free wireless phone" offer when logging onto the company's website. However, if the Experience Optimizer recognizes that John Doe just purchased a new phone, the Engine may then pre-empt the free phone offer and instead present John Doe with a "$10 off his next Wireless Accessory Purchase" offer.

While the EOE may enable and operationalize treatments and experiences, it also may create an architecture solution that is flexible and robust. Organizations that are striving to deliver insight driven sales, service, and marketing consistently across contact channels are often challenged by disparate systems which use different database structures, ID formats, and programming languages. Traditional approaches to insight driven interactions result in the redundant implementation of critical business functions and rules, such as customer identification, evaluation, and treatment selection. The Interaction Optimizing subsystem 202 may deliver a singular and consistent implementation of such key functions via the Experience Optimizer Engine 245 and the Customer Experience Repository 210.1. FIG. 5 illustrates such an ability to consolidate logic. In the traditional approach 510, rules are stored and maintained for each channel 520. In the Experience Optimizer approach offered by the present invention 530, the rules can be centrally stored 540 and maintained.

Figures 3, 4, 5, 6, 7:
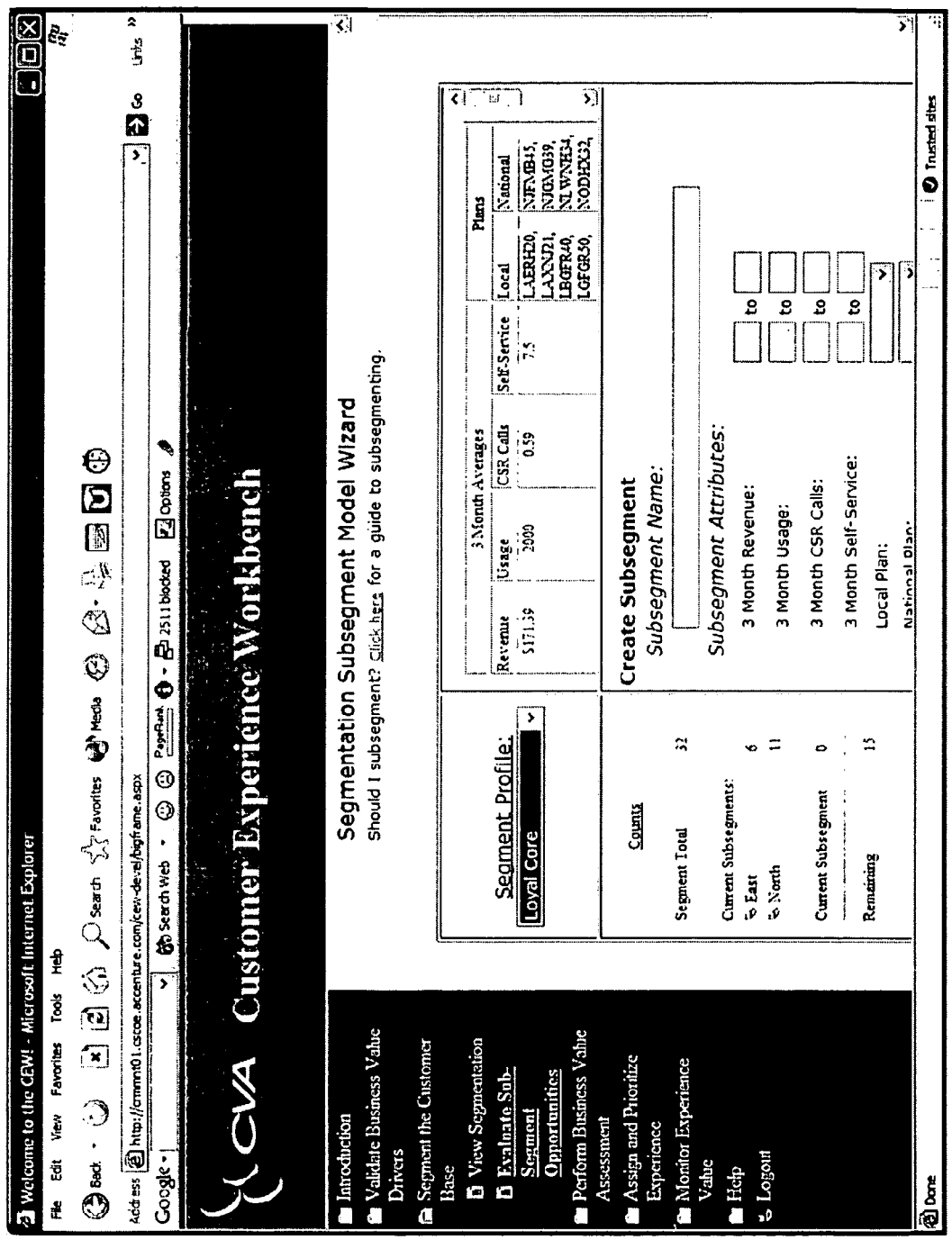

The Experience Optimizer Engine 245, as defined within the system illustrated in FIG. 2-1, provides a preferred hierarchy to process the rules within the Engine itself. This rules hierarchy is illustrated in FIG. 6 and may start by identifying rules that are termed as 'overriding rules' 610. 'Overriding rules" 610 are often governed by various federal laws, company policies or by credit/risk related attributes of customers. These rules should take precedence over all other rules. The next executed set of rules are often "trigger rules" 620. "Trigger rules" 620 are based on changes during the lifecycle of the customer. These triggers are not behavioral events but generally occur over a period of time. These changes provide good opportunities for an up-sell or cross-sell of products or services. Following "Trigger Rules" may be "Event Based Rules" 630. "Event Based Rules" 630 are reactionary rules based on very recent events that took place or an event that took place during the current interaction, such as just purchasing a product. The final set of rules may be "interaction rules" 640. These "Interaction rules" 640 are the defined treatments that have been setup within the workbench 205 and are ready to be executed from the Customer Experience Repository 210. A rule of thumb may be that the majority of rules executed in this processing methodology should occur within the defined "interaction rules." (Of course, in other embodiments, rules may be categorized differently.)

FIG. 7 is a flowchart of the steps taken during an interaction with a customer according to one embodiment of the invention (as shown in FIG. 2-1). A customer may contact the company and makes a request of the company through one of several available communication channels. The channels may include the web (accessed via a personal computer or PDA) 215.1, the IVR accessed with a phone 215.2, email, wireless phone, the contact center (accessed by calling a contact agent), or other channels now known or later developed 215.N. The interface to the communication channel (such as the IVR) receives the request 705/220 and builds a customer interaction record ("CIR") 710 based on who the customer is identified to be, the reason for the contact, and information about the customer. From this record, an XML document is preferably built 715 to be used to transfer the CIR contents to the web services layer 225 and beyond to the experience optimizer engine 720/245. In one preferred embodiment, the engine 245 may execute a common customer service call GetTreatment. This web service would then trigger a policy in the rules engine and begin the rules processing.

The engine 245 may then begin the rules processing as described-in FIG. 6 by first assessing the overriding rules 725/610, then trigger rules 730/620, then event based rules 730/630 and finally the interaction rules 730/640. When all the final treatments are identified per a request 405, the customer experience packet ("CEP") 244 shown in FIG. 2-3 may be updated with values to indicate the customization to one or more defined treatments. For example, if the caller is to be routed to collections based on an EOE rule, then the treatment A section of the CEP may be updated with a special code that will instruct the IVR to transfer the call rather than present the customer with further options.

Once the rules engine 245 has processed all applicable rules, it may finalize the treatments 735 by creating an action that may pass the final defined treatments with values back to the channel interface. In one embodiment this is accomplished by translating the CIR data 240 once again into an XML document and passing that document as a response 250 through the web services layer 225 to the channel interface 740. The various channel interfaces must be already modified so that they can each accept such an XML document and modify the treatments to present to the customer based on values in the document 745.

Figures 3, 4, 5, 6, 7, 8, 9:
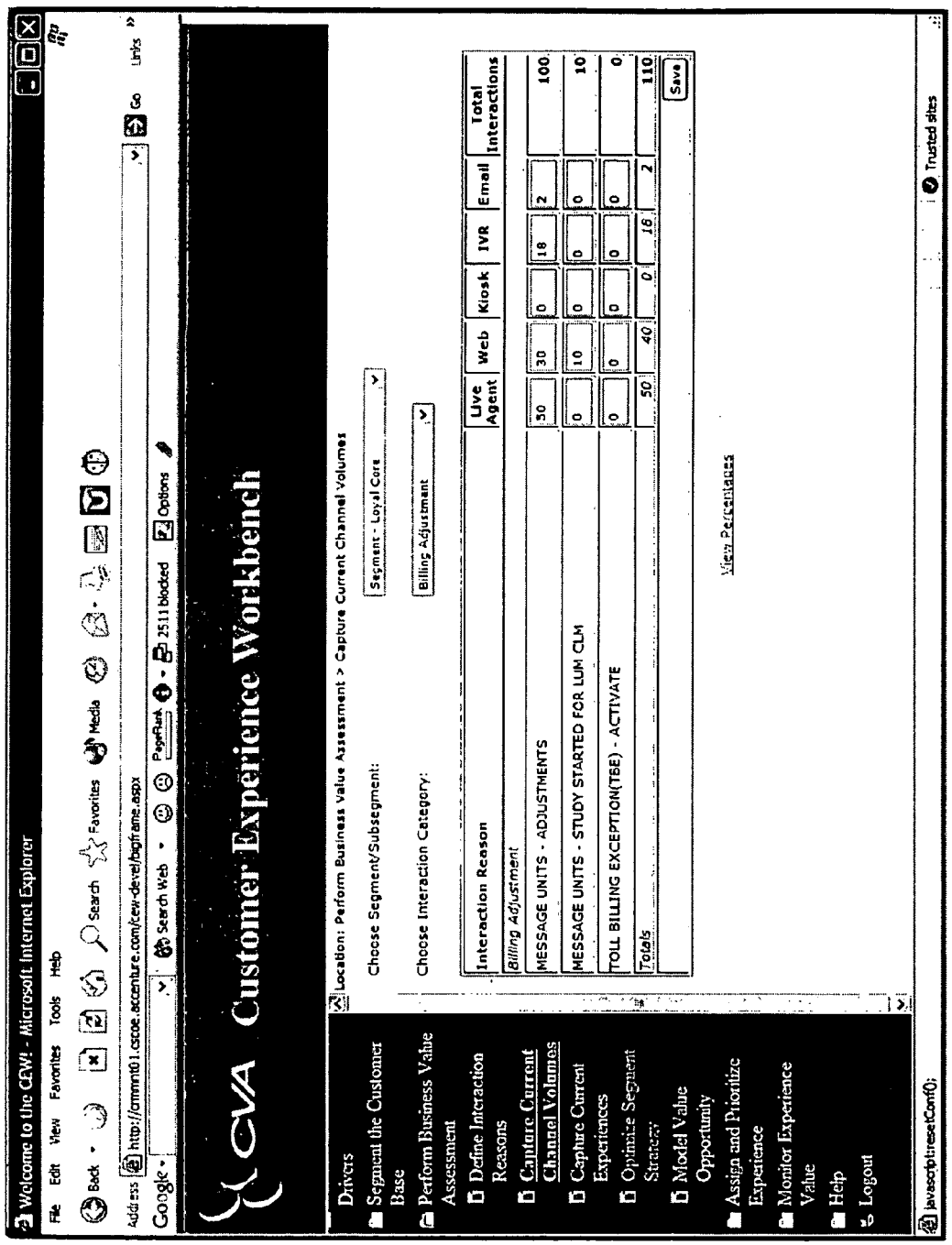

An end-to-end example of how the insight driven interaction process is accomplished, using the Experience Optimizer Engine 245, can be seen in FIG. 8. The top of this figure depicts an example request of a customer in the IVR requesting a billing inquiry 805. Based on these 3 pieces of data (customer ID, channel ID and transaction ID), the IVR makes a web service request called GetTreatment 810. In this one embodiment of the solution, the GetTreatment triggers the creation of the CIR for this specific customer 815. Once formatted into a XML document 820, the CIR 240 is delivered to the EOE 245. When the EOE 245 receives the GetTreatment request, including the CIR 240 data, it reads it and triggers the first policy (i.e. set of rules) 825 in the EOE. This policy begins the rules processing methodology described in FIG. 6. In the example depicted in FIG. 8, overriding rules 830/610 are first analyzed. If the CIR provides the engine with data that triggers an overriding rule to true, then this example creates a treatment called "route call to collections" 835, which then updates the CIR string 840, and sends a web service response 845 back to the channel informing the IVR to route the call to collections as depicted in 'option 1' 855 in the diagram. However, if the overriding rule is false 890, the engine will first get all the treatment data as defined by the CEW. It will then identify if any trigger rules 865/620 are true and update the original treatment data with trigger rule data 870. This same process will happen again with event based data 875 until the CIR string is fully updated with all final treatments 880. In this example, treatment #6 and #7 have been updated based on trigger and event based rules. A final web service response 845 will be delivered and an updated CIR XML document will be created 850. The last step will be delivering this document with seven treatments to the IVR channel. These final treatments are depicted as 'option 2' 885 in the diagram of FIG. 8.

While the interaction processing of FIGS. 7 and 8 is useful for a request from any type of communication channel, one embodiment of the invention has been developed specifically to handle self-service interactions. Such interactions are those in which the customer seeks to help himself or herself without human intervention. The channels commonly used for self-service interactions are most frequently the IVR, web, and email. Other communication channels now known or later developed may also be used for self-service interactions.

FIG. 9 illustrates how one preferred embodiment of the invention creates code appropriate to a certain channel. When the request from any of the communication channels 215 is processed by the optimizing subsystem 202, the response may be in XML 910 or other channel-appropriate format, such as VXML 905, XHTML 915, SALT 920 or other format now known or later developed.

Figures 3, 4, 5, 6, 7, 8, 9, 10:
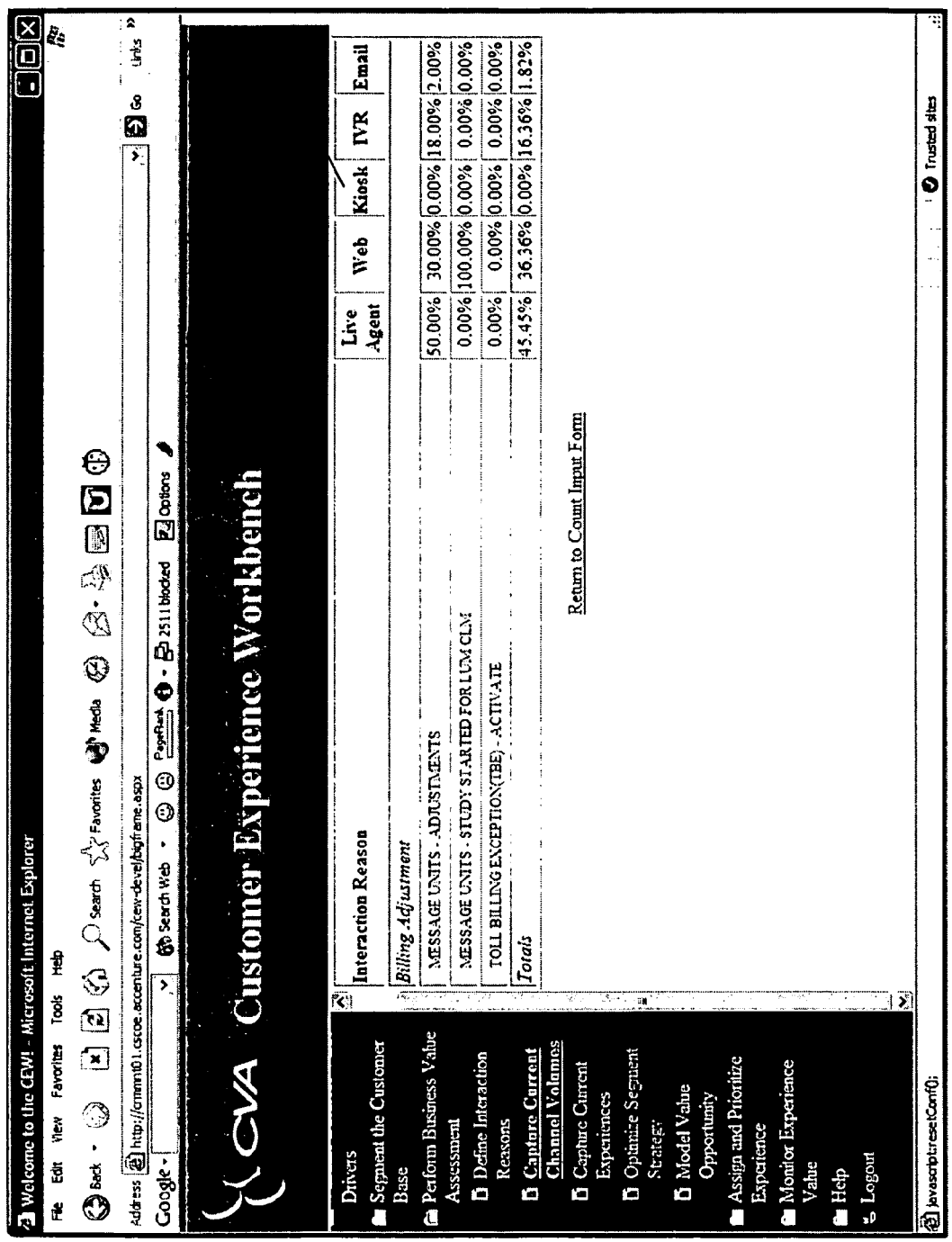
Figures 3, 4, 5, 6, 7, 8, 9, 10, 11:
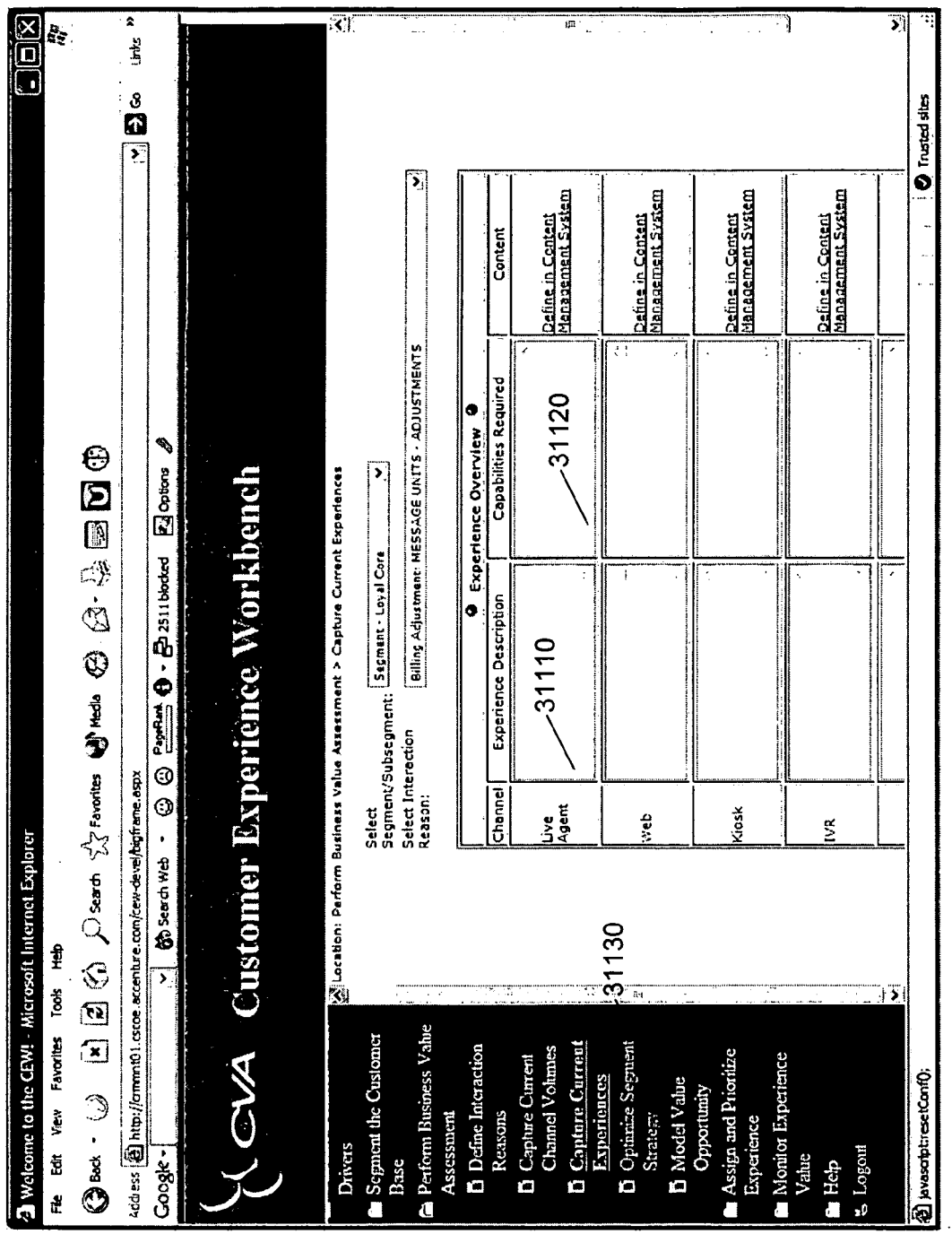
Figures 3, 4, 5, 6, 7, 8, 9, 10, 11, 12:
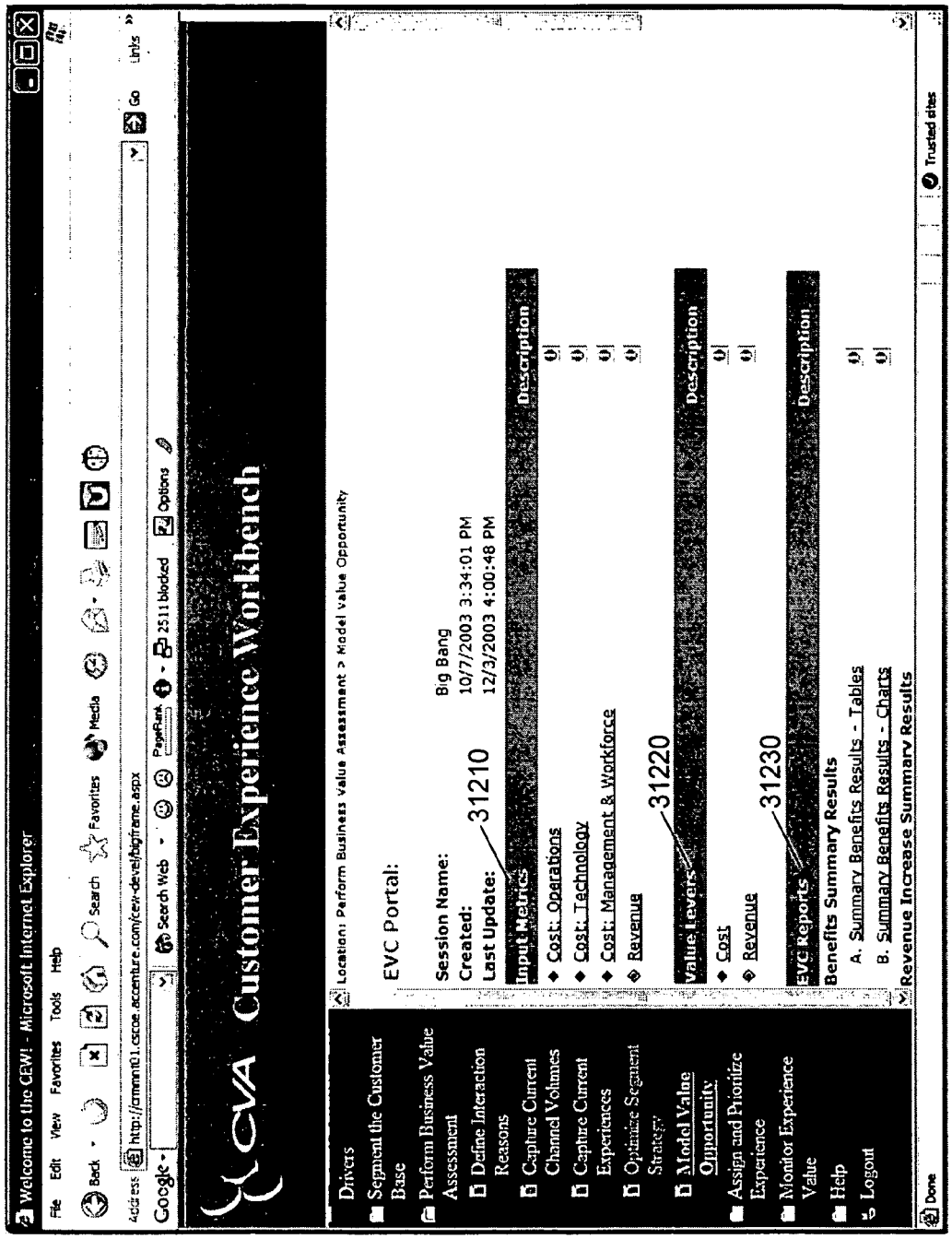
Figures 3, 4, 5, 6, 7, 8, 9, 10, 11, 12, 13:
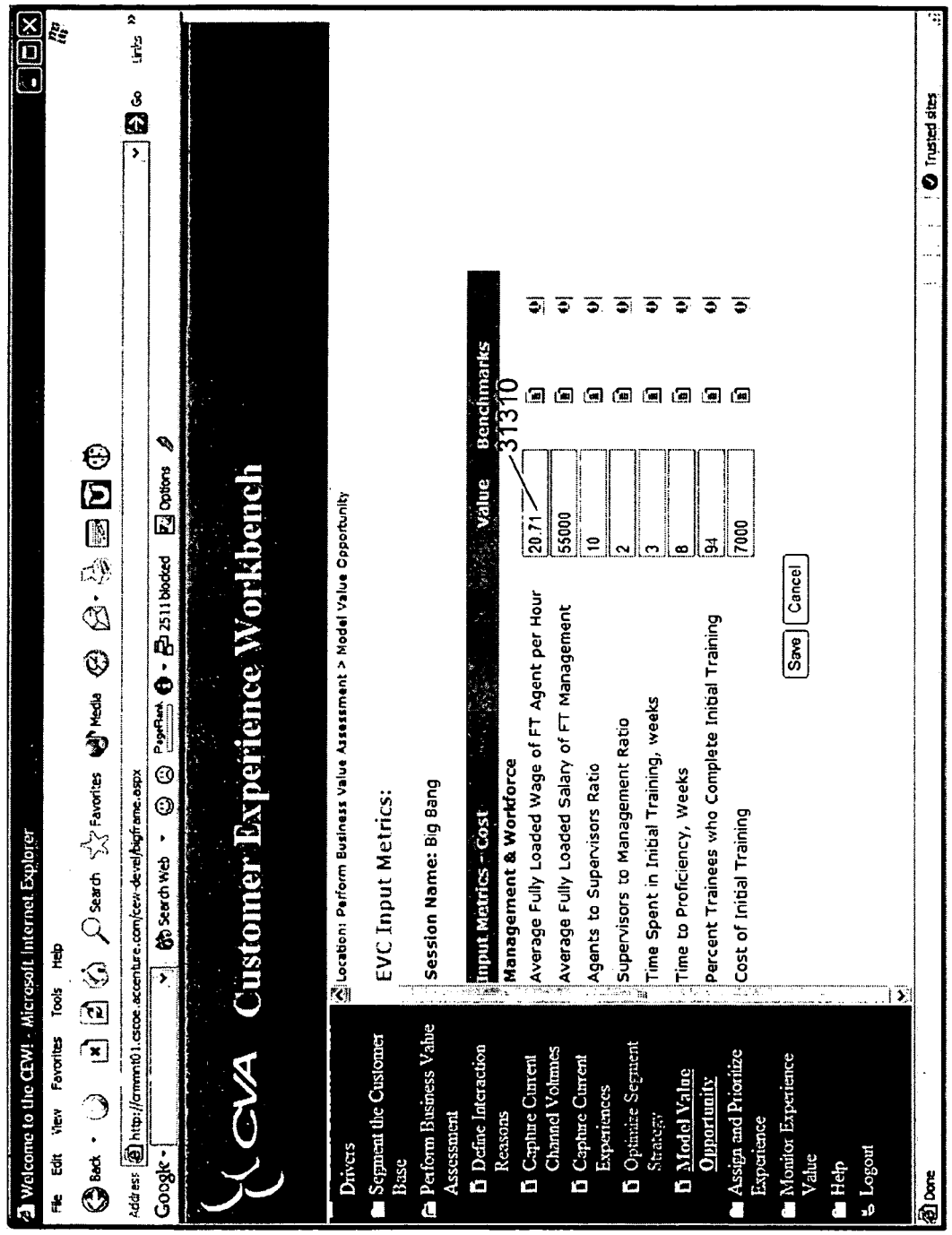
Figures 3, 4, 5, 6, 7, 8, 9, 10, 11, 12, 13, 14:
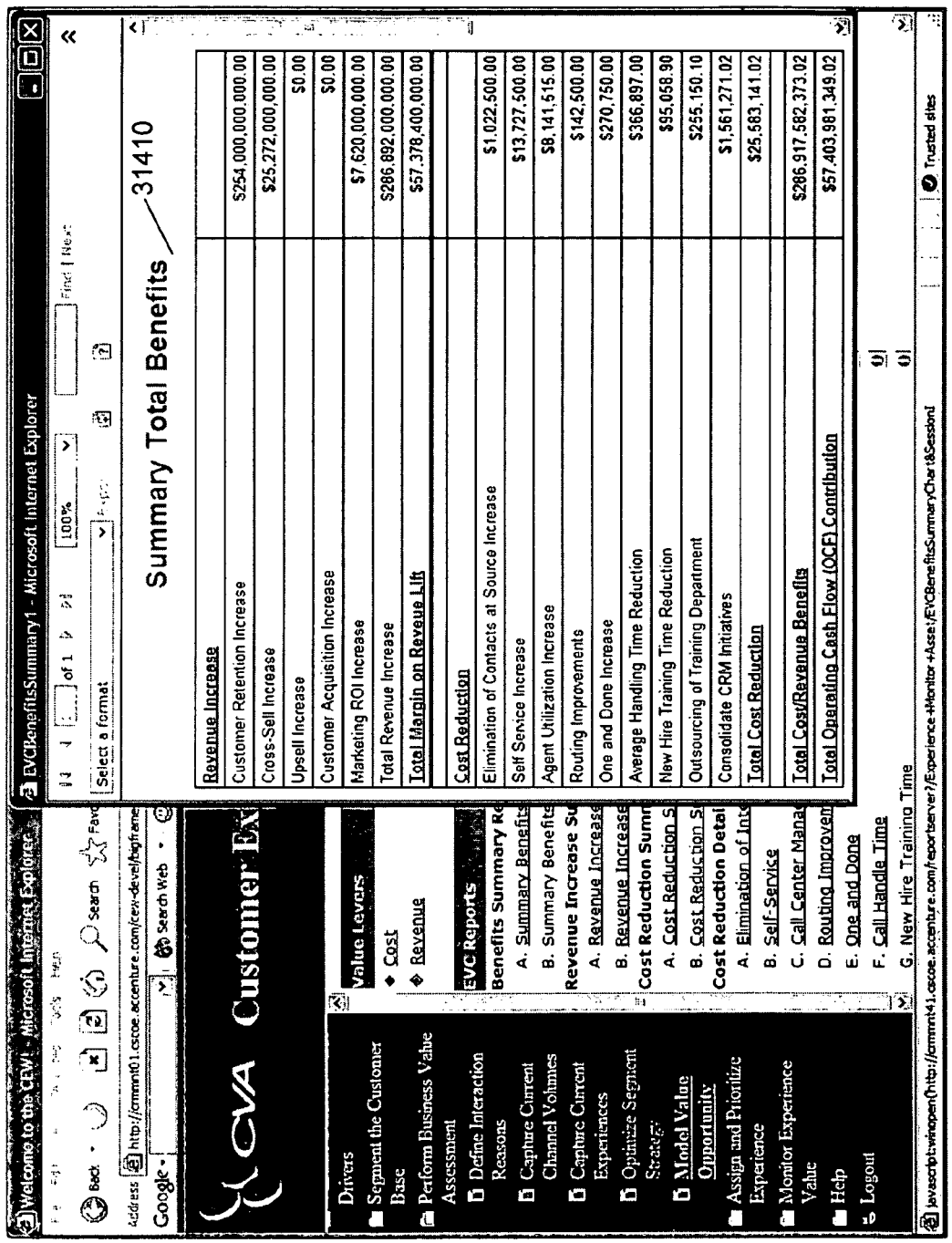
Figures 3, 4, 5, 6, 7, 8, 9, 10, 11, 12, 13, 14, 15:
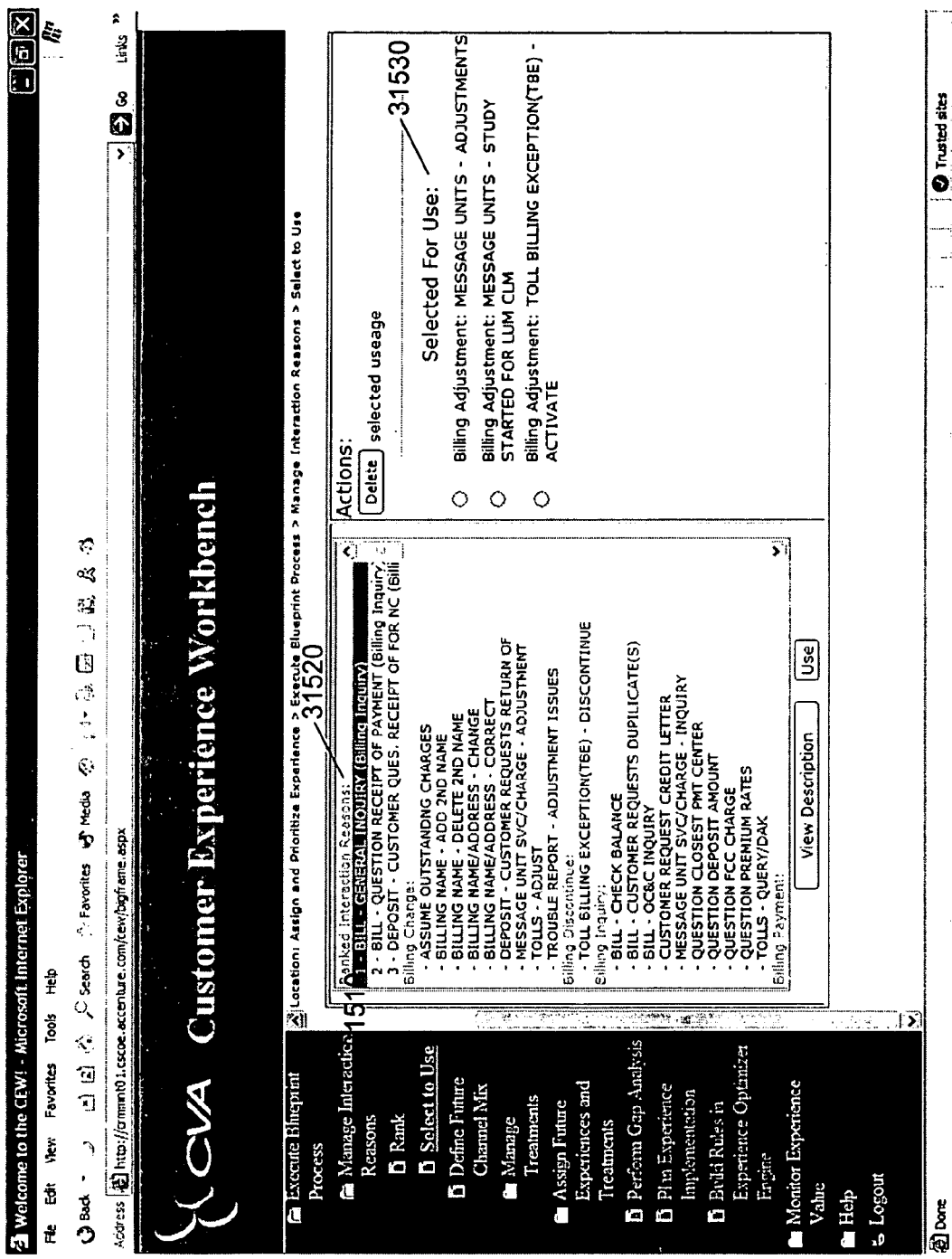
Figures 3, 4, 5, 6, 7, 8, 9, 10, 11, 12, 13, 14, 15, 16:
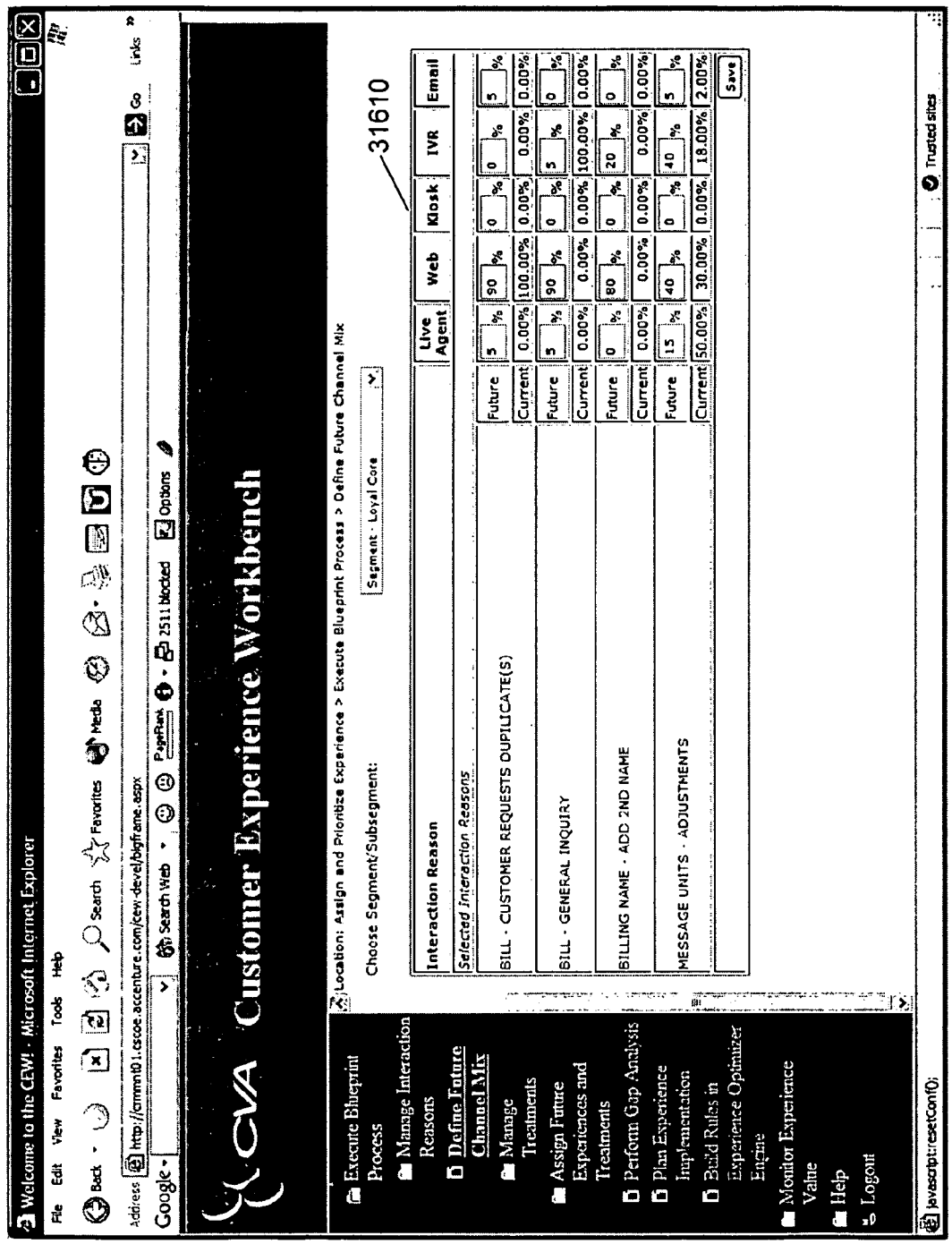
Figures 3, 4, 5, 6, 7, 8, 9, 10, 11, 12, 13, 14, 15, 16, 17:
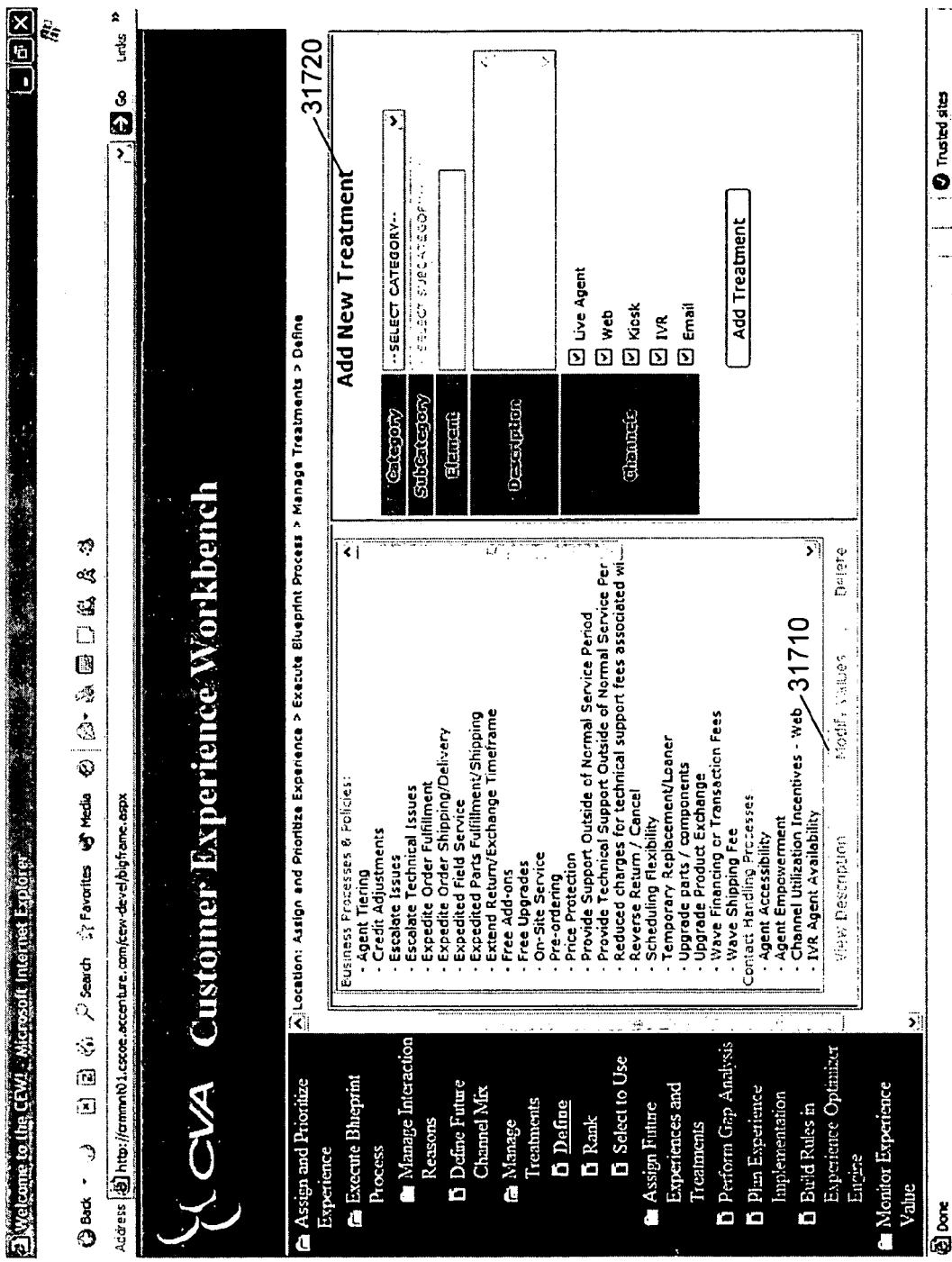
Figures 3, 4, 5, 6, 7, 8, 9, 10, 11, 12, 13, 14, 15, 16, 17, 18:
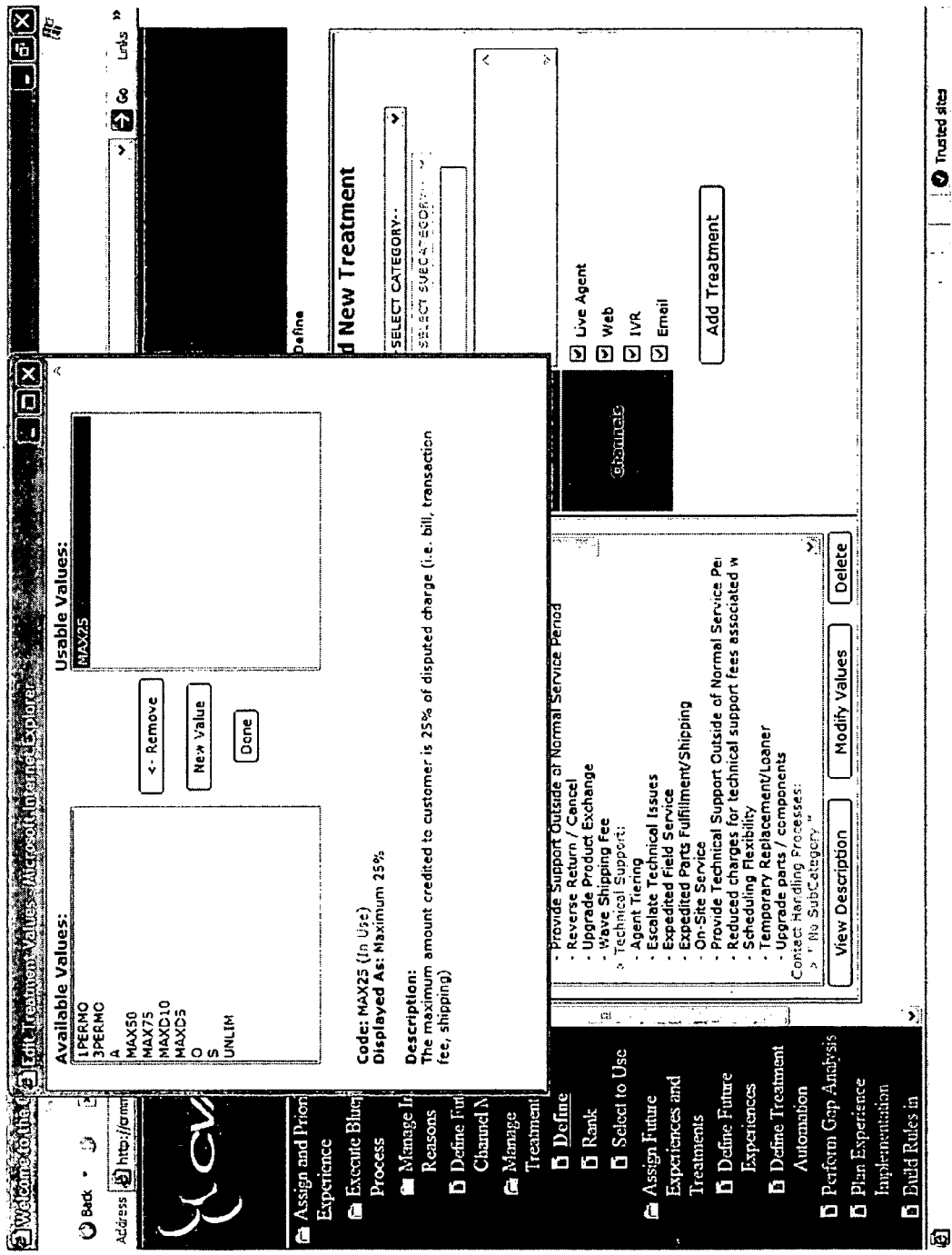
Figures 3, 4, 5, 6, 7, 8, 9, 10, 11, 12, 13, 14, 15, 16, 17, 18, 19, 20:
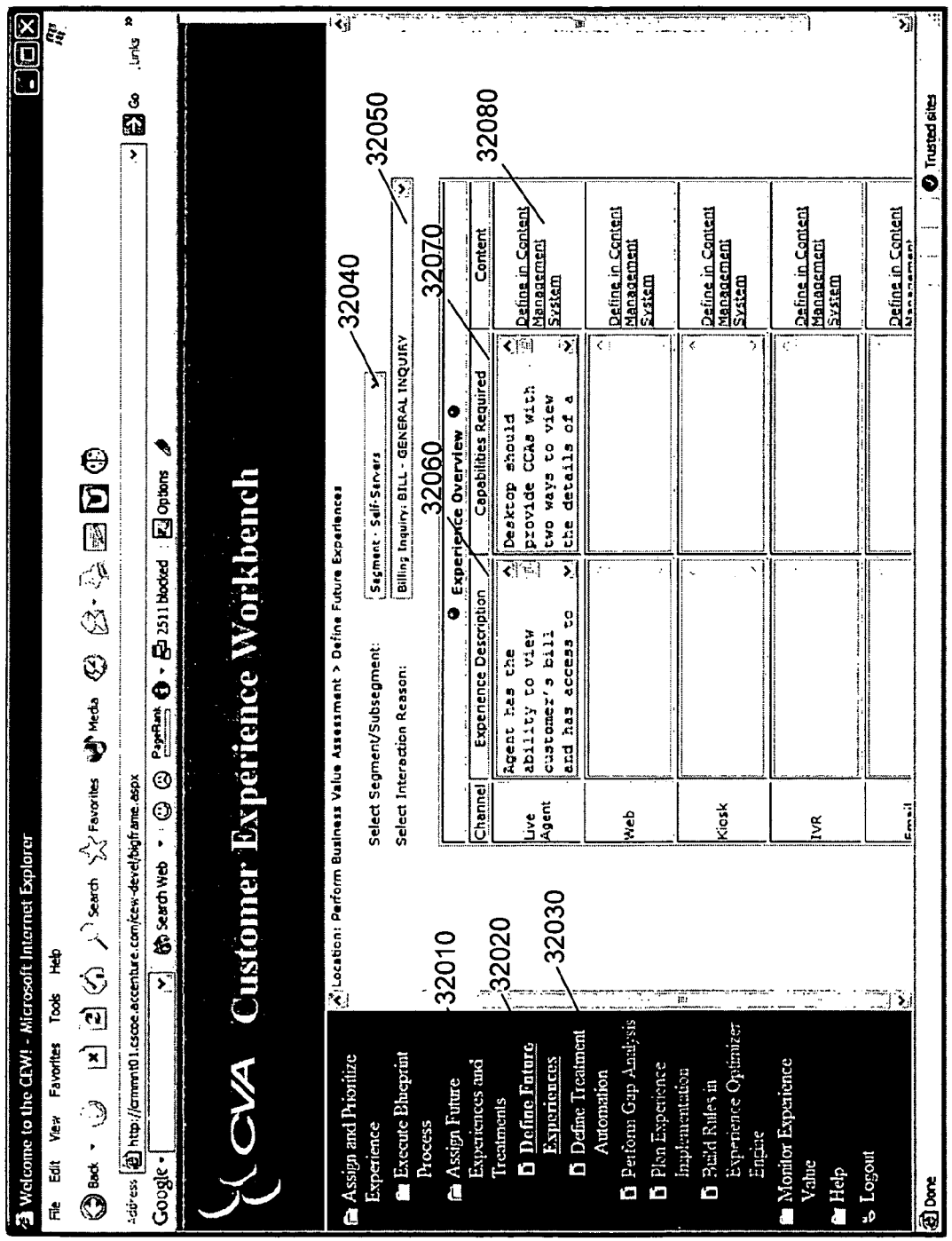
Figures 3, 4, 5, 6, 7, 8, 9, 10, 11, 12, 13, 14, 15, 16, 17, 18, 19, 20, 21:
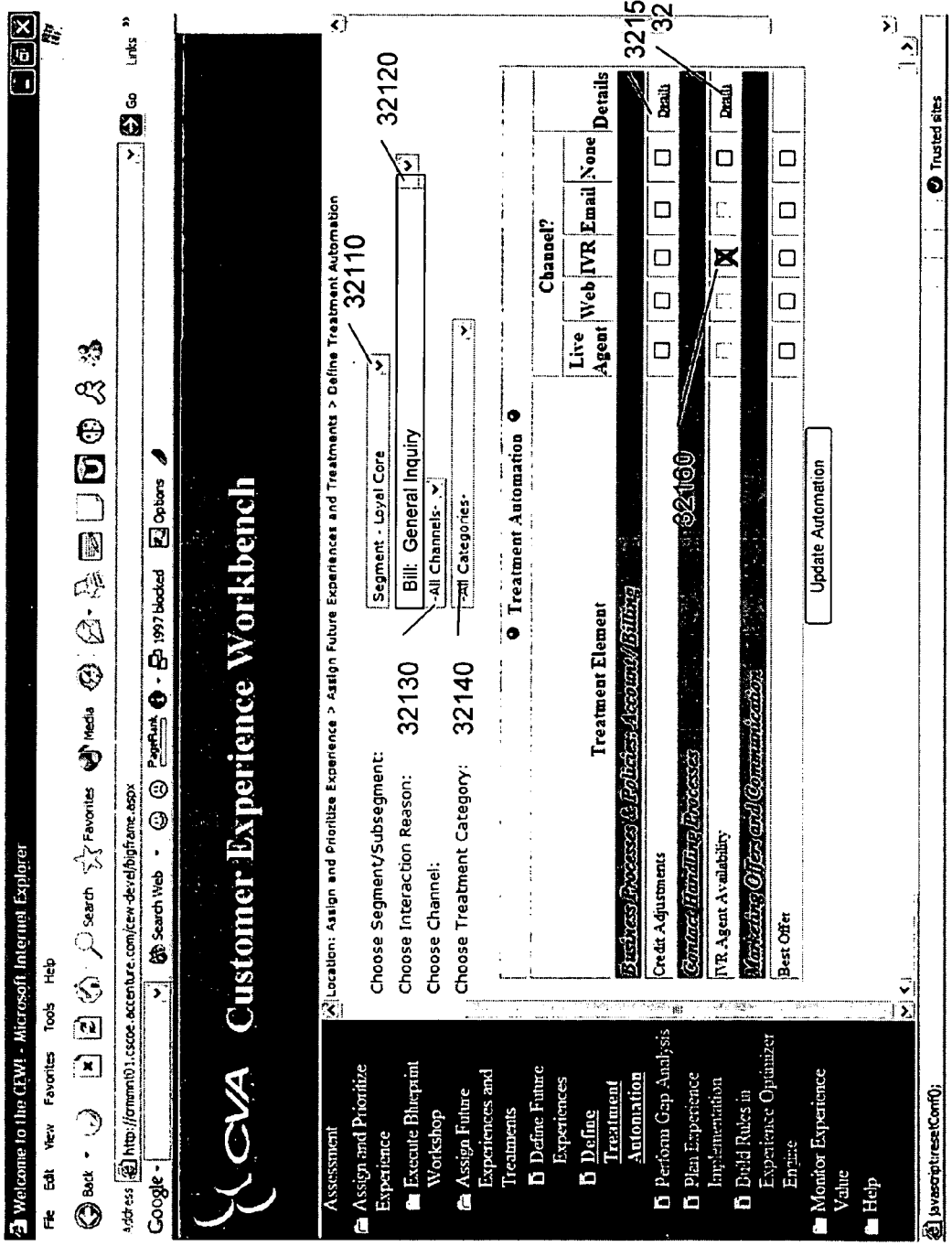
Figures 3, 4, 5, 6, 7, 8, 9, 10, 11, 12, 13, 14, 15, 16, 17, 18, 19, 20, 21, 22:
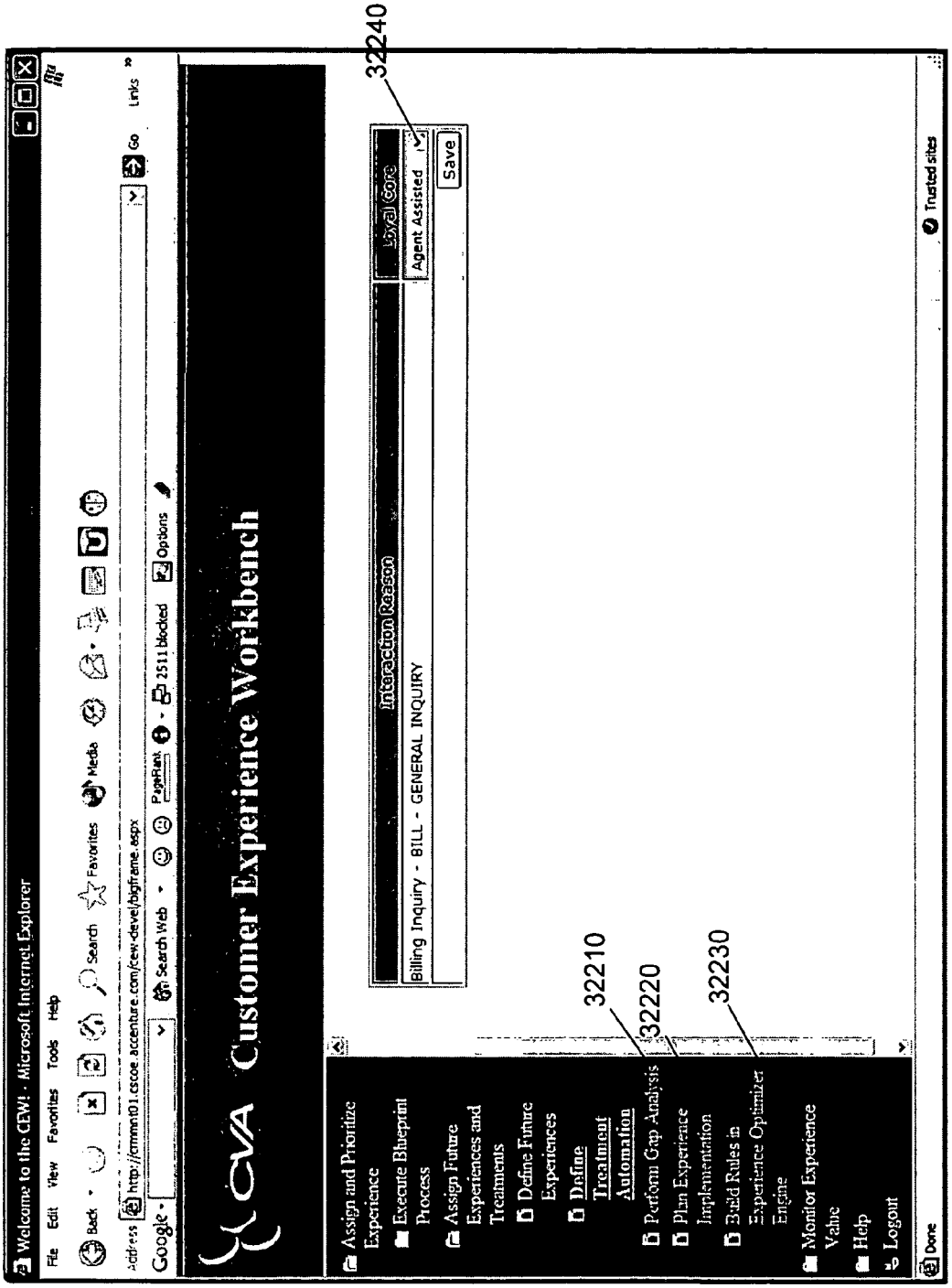
Figures 3, 4, 5, 6, 7, 8, 9, 10, 11, 12, 13, 14, 15, 16, 17, 18, 19, 20, 21, 22, 23:
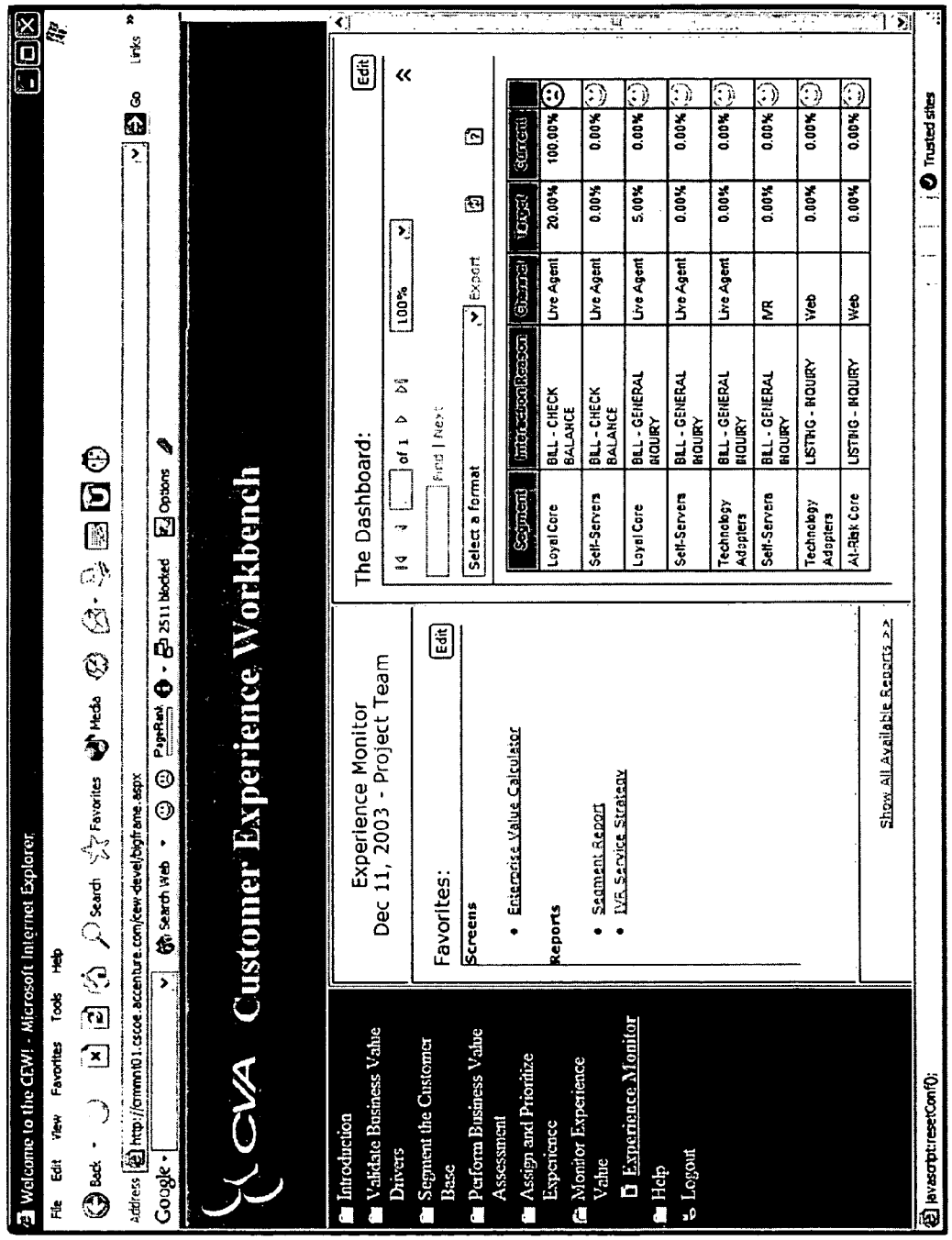
Figure 10:
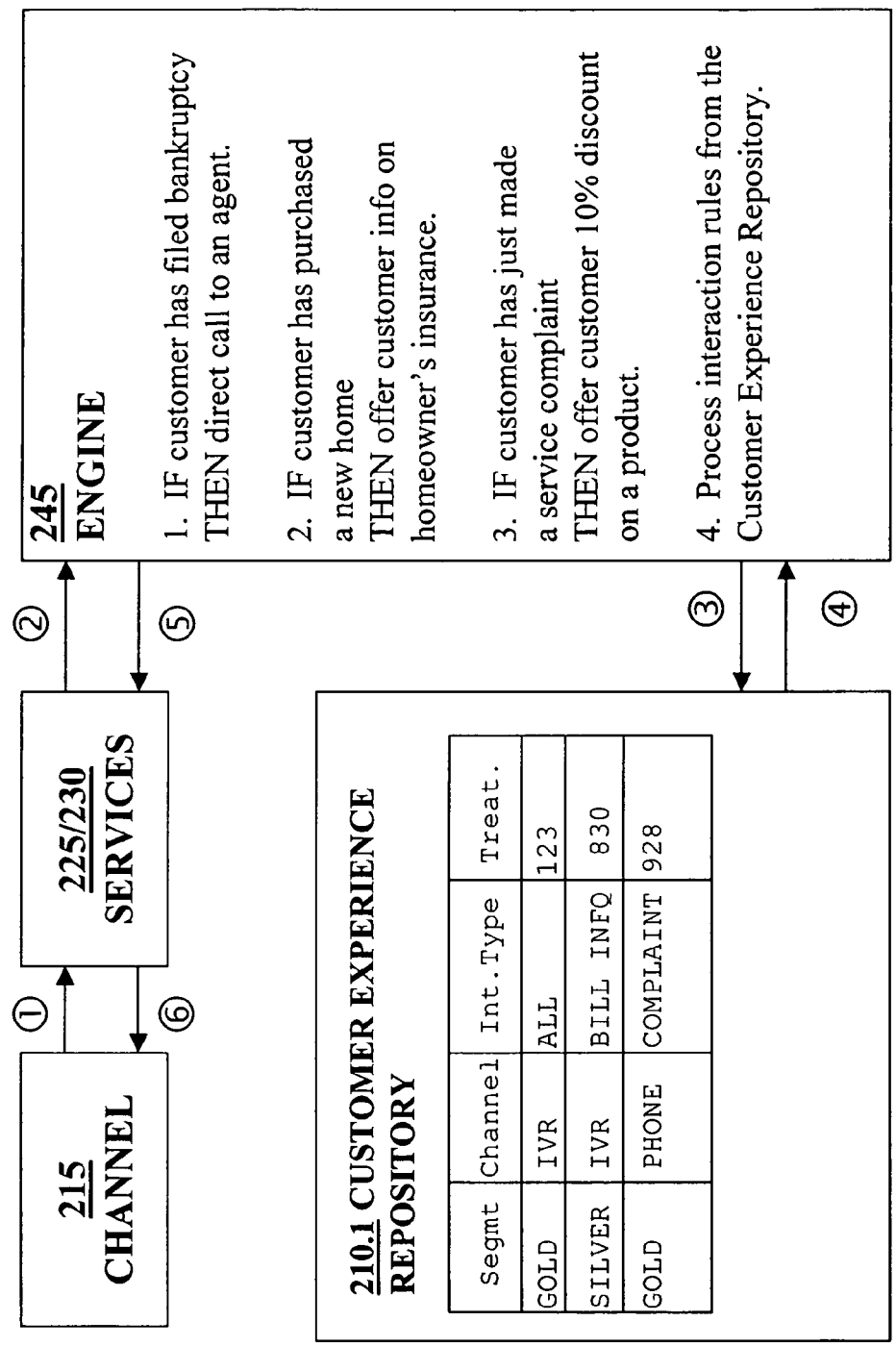

FIG. 10 is another conceptual illustration showing how the rules engines may leverage overriding rules (such as override rules, trigger rules and event-based rules) as well as workbench-created interaction rules to choose treatments for a customer experience. In FIG. 10, one of the channels 215 may send a request to the system's services layers 225/230. The services may send the request (via a CIR) to the engine 245. The engine may begin by applying various overriding rules, such as override rules (rule 1), trigger rules (rule 2), and event-based rules (rule 3). Then the engine 245 may process the interaction rules that were set up through the workbench subsystem. To do this, the engine 245 may access the blueprint stored in the repository 210 to determine which treatment(s) are appropriate based on the customer's segment, channel, interaction type, etc. For example, the interaction rules derived from the blueprint shown in FIG. 10 indicate that if a customer using the IVR is in the SILVER segment and if that customer is making a billing inquiry request, then treatment number 830 should be applied. Once the engine 245 has complied all of the treatments appropriate to the request, they are returned to the channel 215 for presentation to the customer.

Phase 6. Monitoring Results of Customer Interactions (Step 160)

The workbench may offer the user an 'Experience Monitor' asset to monitor the status of experiences and provide data that will lead to enhanced results. The Experience Monitor is a diagnostic tool that uses business performance metrics and customer level data across customer experiences to diagnose performance issues and highlight opportunities. The value of this tool comes from eliminating the need to review all the hundreds of experiences defined within the Customer Experience Workbench 205. The analysis is accomplished using statistical analysis to focus in on the experiences whose value is misaligned with business expectations. Users can then focus their efforts on revising those experiences to increase the overall value.

The Experience Monitor solution may provide the data and processes to measure key performance metrics for each defined experience as well as methods to assess drivers for overall value and for each performance metric. It may measure the value of an experience with a single metric that encompasses all the key revenue and cost drivers including Average Handle Time, Cost per Contact, Sales Opportunities & Conversion, Satisfaction, and Retention. This solution provides methods to identify experiences performing well and poorly along with suggestions on how to modify the experience for better outcomes.

The 'experience monitor' may reside within the workbench 205 and may create as well as display reports related to the customer experience. One embodiment of the experience monitor is illustrated in FIG. 3-23. FIG. 3-23 also illustrates a dashboard to the experience monitor asset where a user can control the viewing of specific reports based on their needs. By monitoring the results, a closed loop of processing may be made. This closed loop may allow the company to derive insight from the results and apply that insight to future experiences with the same or other customers.

In one embodiment of the invention, insight about the customer is derived from customer data, results of past interactions, and the like. In such an embodiment, the insight is used to create specific rules and treatments to be offered to the customer through the engine 245. Details and the benefits of deriving and leveraging customer insight through closed-loop processes such as this has been described in the commonly-owned utility patent application titled "Adaptive Marketing Using Insight Driven Customer Interaction" (Ser. No. 10/302,395, filed on Nov. 22, 2002) which is incorporated herein by reference.

While the specification describes particular embodiments of the present invention, those of ordinary skill can devise variations of the present invention without departing from the inventive concept. For example, while examples discussed above have sometimes centered around the IVR and/or web channels, the present invention may be implemented for any communication channel now known or later developed. As another example, the workbench tool 205 may be programmed with user interface screens that differ from those shown in FIGS. 3-1 through 3-24. In the drawings illustrating the present invention, elements on the various drawings may represent the same or similar components, whether or not they are numbered the same.

We claim:

1. A method for optimizing customer interactions, comprising:
   interfacing with a plurality of different types of communication channels;
   receiving requests from at least one customer for customer interactions over at least two different types of communication channels;
   generating a customer interaction record with a plurality of data fields for the at least one customer, the customer interaction record comprising a batch data section, a customer experience packet section, and a real time data section;
   generating an XML document from the customer interaction record;
   using a web services layer to pass the XML document to a central, channel-independent rule processing engine;
   identifying the at least one customer;
   for each requested customer interaction, choosing at least one treatment for processing the customer interaction using the central, channel-independent processing engine;
   updating the customer experience packet section of the customer interaction record and the XML document to indicate at least one treatment for the customer;
   using the web services layer to send the XML document to a channel to indicate the at least one treatment for the customer, and
   processing the customer interactions by the central, channel-independent processing engine, based on the treatments chosen.

2. The method from claim 1, wherein choosing the at least one treatment is a function of a customer segment, an interaction type and an interaction channel.

3. The method from claim 1, further comprising:
   inserting data correlating to the at least one treatment into a customer intelligence record; and
   returning the customer intelligence record to one of the plurality communication channels for instructing the channel on the treatments to present to the customer.

4. The method from claim 1, wherein the step of choosing at least one treatment accesses a central repository where treatments have been stored by an independent design tool.

5. The method from claim 1, further comprising sending the at least one treatment to one of the plurality of communication channels via a plurality of services.

6. The method from claim 1, wherein the step of choosing at least one treatment comprises leveraging insight about customers from analytical models to derive at least one treatment.

7. The method from claim 6, wherein leveraging insight from analytical models comprises:
   extracting customer data for a plurality of customers from at least one database;
   training analytical models to predict customer behavior, wherein the analytical models are trained using the customer data extracted from at least one database;
   gathering the customer interaction results; and
   retraining the analytic models to refine the customer behavior prediction, wherein the analytical models are re-trained using the customer data extracted from at least one database as well as the customer interaction results.

8. A computer program stored on a computer readable medium for execution by a computer, the computer program comprising:
   a code segment for receiving requests from at least one customer for customer interactions over at least two different types of communication channels from a plurality of communication channels;
   a code segment for generating a customer interaction record with a plurality of data fields for the at least one customer, the customer interaction record comprising a batch data section, a customer experience packet section, and a real time data section;
   a code segment for generating an XML document from the customer interaction record;
   a code segment for using a web services layer to pass the XML document to a central, channel-independent rule processing engine;
   a code segment for identifying the at least one customer;
   a code segment for choosing, for each requested customer interaction, at least one treatment for processing the customer interaction using the central, channel-independent processing engine;
   a code segment for updating the customer experience packet section of the customer interaction record and the XML document to indicate at least one treatment for the customer;
   a code segment for using the web services layer to send the XML document to a channel to indicate the at least one treatment for the customer, and
   a code segment for processing the customer interactions by the central, channel-independent processing engine, based on the treatments chosen.

9. The computer program from claim 8, wherein the code segment for choosing the at least one treatment leverages a function of a customer segment, an interaction type and an interaction channel.

10. The computer program from claim 8, further comprising:
    a code segment for inserting data correlating to the at least one treatment into a customer intelligence record; and
    a code segment for returning the customer intelligence record to one of the plurality communication channels for instructing the channel on the treatments to present to the customer.

11. The computer program from claim 8, wherein the code segment for choosing at least one treatment accesses a central repository where treatments have been stored by an independent design tool.

12. The computer program from claim 8, further comprising a code segment for sending the at least one treatment to one of the plurality of communication channels via a plurality of services.

13. The computer program from claim 8, wherein the code segment for choosing at least one treatment comprises a code segment choosing at least one treatment that has been derived from insight about customers using analytical models.

14. The computer program from claim 13, wherein the code segment for leveraging insight from analytical models comprises:
   a code segment for extracting customer data for a plurality of customers from at least one database;
   a code segment for training analytical models to predict customer behavior, wherein the analytical models are trained using the customer data extracted from at least one database;
   a code segment for gathering the customer interaction results; and
   a code segment for retraining the analytic models to refine the customer behavior prediction, wherein the analytical models are re-trained using the customer data extracted from at least one database as well as the customer interaction results.

15. A system for optimizing customer interactions, comprising:
   a computer system configured to provide
      a channel layer for communicating with a plurality of different types of communication channels and
      a services layer for processing requests from at least one customer for customer interactions over at least two different types of communication channels, and for identifying the at least one customer;
   the computer system also including an interaction optimizing subsystem for choosing, for each requested customer interaction, at least one treatment for processing the customer interactions, wherein
      the interaction optimizing subsystem comprises a central, channel-independent processing engine and a customer interaction record with a plurality of data fields for a customer;
      the customer interaction record comprises a batch data section, a customer experience packet section, and a real time data section, and is used to generate an XML document that is passed to the central, channel-independent processing engine;
      the customer experience packet section of the customer interaction record and the XML document are updated to indicate at least one treatment for the customer, and the XML document is sent to a channel to indicate the at least one treatment for the customer; and
      the processing for the customer interactions is by the central, channel-independent processing engine, and based on the treatments chosen.

16. The computer-implemented system from claim 15, wherein the interaction optimizing subsystem chooses the at least one treatment as a function of a customer segment, an interaction type and an interaction channel.

17. The system from claim 15, further comprising:
   wherein the interaction optimizing subsystem uses a customer intelligence record, which is returned to one of the plurality of communication channels for instructing the channel on the treatments to present to the customer;
   wherein data correlating to the at least one treatment is stored in the customer intelligence record.

18. The system from claim 15, wherein the interaction optimizing subsystem chooses at least one treatment from a central repository;
   wherein the treatments have been stored on the central repository by an independent design tool.

19. The system from claim 15, wherein the interaction optimizing subsystem comprises a plurality of services for sending the at least one treatment to one of the plurality of communication channels.

20. The system from claim 15, wherein the interaction optimizing subsystem chooses the at least one treatment that has been derived from insight about customers using analytical models.

21. The system from claim 20, further comprising:
   at least one database upon which is stored customer data for a plurality of customers;
   wherein the interaction optimizing subsystem further comprises a results gathering module for gathering customer interaction results;
   wherein the gathered customer interaction results are used to re-trained the analytical models.

* * * * *

UNITED STATES PATENT AND TRADEMARK OFFICE
CERTIFICATE OF CORRECTION

| | | |
|---|---|---|
| PATENT NO. | : 8,103,530 B2 | Page 1 of 1 |
| APPLICATION NO. | : 10/811367 | |
| DATED | : January 24, 2012 | |
| INVENTOR(S) | : Kevin N. Quiring et al. | |

It is certified that error appears in the above-identified patent and that said Letters Patent is hereby corrected as shown below:

In claim 3, column 17, line 56, "plurality communication channels" should read --plurality of communication channels--.

In claim 10, column 18, line 55, "plurality communication channels" should read --plurality of communication channels--.

In claim 21, column 20, line 40, "to re-trained" should read --to re-train--.

Signed and Sealed this
Twenty-fourth Day of April, 2012

David J. Kappos
*Director of the United States Patent and Trademark Office*